(12) United States Patent
Akiyama et al.

(10) Patent No.: US 8,161,047 B2
(45) Date of Patent: Apr. 17, 2012

(54) MANAGING CONFIGURATION ITEMS

(75) Inventors: Kazuhito Akiyama, Tokyo (JP); Yasuhiro Suzuki, Tokyo (JP); Tadashi Tsumura, Kangawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 12/337,597

(22) Filed: Dec. 17, 2008

(65) Prior Publication Data

US 2009/0187596 A1    Jul. 23, 2009

(30) Foreign Application Priority Data

Jan. 21, 2008 (JP) .................................. 2008-010923

(51) Int. Cl.
*G06F 7/00* (2006.01)
*G06F 17/30* (2006.01)

(52) U.S. Cl. ........................................................ 707/736
(58) Field of Classification Search .................... 707/736
See application file for complete search history.

(56) References Cited

U.S. PATENT DOCUMENTS

| | | | | |
|---|---|---|---|---|
| 5,987,497 | A * | 11/1999 | Allgeier ......................... | 709/201 |
| 6,119,157 | A * | 9/2000 | Traversat et al. ............. | 709/220 |
| 7,523,128 | B1 * | 4/2009 | Miller et al. .................... | 1/1 |
| 2008/0183724 | A1 * | 7/2008 | Mueller .......................... | 707/100 |
| 2009/0144319 | A1 * | 6/2009 | Panwar et al. ................. | 707/102 |

OTHER PUBLICATIONS

Configuration Discovery and Tracking Terminology, IBM Redbooks Deployment Guide Series: IBM Tivoli Change and Configuration Management Database v1.1, IBM Corp. 2006, (24 pgs).
Ling Tai et al, IBM Tivoli Common Data Model: Guide to Best Practices, IBM Redpaper, IBM Corp. 2008, (7 pgs).

\* cited by examiner

*Primary Examiner* — Angela Lie
*Assistant Examiner* — Kris Mackes
(74) *Attorney, Agent, or Firm* — Toler Law Group

(57) ABSTRACT

A computer system is disclosed that includes a repository, a discovery section, a determining section, and a data creating section. The repository holds, for each configuration item, data indicating at least one predetermined attribute of the configuration item and a relationship with another configuration item. The discovery section detects information on configuration items. The determining section determines association of a first configuration item with a second configuration item and association of the first configuration item with a third configuration item. The data creating section creates common data including an attribute common to attributes of the first configuration item associated with the second configuration item and attributes of the first configuration item associated with the third configuration item and plural derived data items, each including an attribute that is not common thereto. The common data and the plural derived data items are stored in the repository.

20 Claims, 18 Drawing Sheets

203

| CI INSTANCE | |
|---|---|
| INSTANCE NAME | DEVICE A |
| MODEL NAME | A |
| ATTRIBUTE VALUE | S = xxxx<br>T = xxxx<br>U = xxxxx |
| RELATIONSHIP | usedBy: M<br>connectAt: E<br>runAt: H |
| STATUS | ACTIVE |
| CREATION DATE | xxxx/xx/xx xx:xx:xx |

201

| DATA MODEL | |
|---|---|
| MODEL NAME | A |
| MODEL ATTRIBUTE | ATTRIBUTE S<br>ATTRIBUTE T<br>ATTRIBUTE U |
| RELATIONSHIP | usedBy<br>connectAt<br>runAt |
| DISCOVERY SCHEME (CLASS) | A-Discovery |

204

| RELATIONSHIP MODEL | |
|---|---|
| RELATIONSHIP NAME | usedBy |
| TARGET DATA MODEL | B,C,D,M |
| DESCRIPTION | xxxxxx |

202

| DISCOVERY | |
|---|---|
| NAME | A-Discovery |
| COLLECTION TARGET (SCOPE) | Local Domain |
| ATTRIBUTES TO BE COLLECTED | xxx,xxx,xxx,xxx |
| RELATIONSHIP TO BE COLLECTED | xxx,xxx,xxx,xxx |
| STATUS | ACTIVE |

FIG. 2B

MANAGING CONFIGURATION ITEMS

CROSS REFERENCE TO RELATED APPLICATIONS

The present application claims priority from Japanese patent application number 2008-10923 filed on Jan. 21, 2008 and entitled "COMPUTER SYSTEM AND METHOD FOR MANAGING CONFIGURATION ITEM, AND COMPUTER PROGRAM FOR ACHIEVING THE SAME."

FIELD

The present disclosure relates to a computer system, method and a computer program for managing a configuration item, and in particular, to a computer system for managing a configuration item to be associated with a plurality of other configuration items.

BACKGROUND

ITIL (Information Technology Infrastructure Library) is a collection of best practices for achieving an IT service management (ITIL is a registered trademark and a registered community trademark of the Office of Government Commerce). ITIL includes service support and service delivery. One type of service support is configuration management. The configuration management is a process of identifying a configuration item (CI), keeping and updating information on the configuration item, and checking and inspecting the configuration item. A configuration item is a resource to be subjected to configuration management. A configuration item includes not only system resources including hardware and software, but also facilities to provide an IT service, documents, such as a rule book, procedures document and configuration diagrams on the management of the IT service, services like maintenance information, processes, and human resources. The framework of the ITIL recommends unitary management using a database called a configuration management database (CMDB) to manage a configuration item. The CMDB is a database for recording a relationship between at least one predetermined attribute of a configuration item and another configuration item. Capabilities that are provided by implementing the CMDB include a capability of automatically discovering information on a configuration item (also called discovery or automatic detection) and a capability of automatically updating information on a configuration item (also called tracking). Information is reflected on a configuration item in the CMDB.

International Business Machines Corporation provides "Tivoli Change and Configuration Management Database" (Tivoli CCMDB) as software to assist construction of a CMDB and control an operational process based on the CMDB. In the Tivoli CCMDB, operation management software is implemented to execute discovery and tracking.

The Tivoli CCMDB can identify 300 different configuration items in a distributed network environment, such as a server, a client, an operating system (OS), middleware (Web/AP/DBMS/LDAP, etc.), package software, a management tool, a network device and a storage device, and can automatically discover and update information on individual configuration items, such as information on configuration items of a computer, information on an application which runs on each computer, configuration information of a network attached storage (NAS) or the like connected to each computer, and configuration information of a storage area network (SAN) directly connected to a network. While the method of gathering information on each configuration item differs depending on targets to be managed, a computer system which manages a CMDB regularly accesses the remote interface for management using an SSH (Secure SHell) or the like to read a setting file on the OS or configuration information, or executes a setting acknowledge command. It is therefore unnecessary to introduce an agent program in a configuration item to be managed. Information which is discovered and updated in the above manner is organized to belong to any one of 31 different sections (Computer System, Database, Application, Process), 636 different classes (basic units of data models; belonging to one or more sections), 2609 different attributes (attribute information of data; belonging to one class), 7 different interfaces (a group with high use frequency; belonging to a plurality of sections), 57 different relationships, and 49 different data types (types of data). Information on the association of each configuration item with another configuration item is given to a GUI display tool, for example, Tivoli Application Dependency Discovery Manager (TADDM) console. Then, the relationship of each configuration item with another configuration item is visually displayed, using an individual blocks and linkage between the blocks.

SUMMARY

A CMDB in the IT service management may be used in management of IT devices as well as managing, for example, industrial machines.

The present disclosure provides a computer system for managing a configuration item to be associated with a plurality of other configuration items. The computer system includes a repository that holds, for each configuration item, one set of data indicating at least one predetermined attribute of the configuration item and a relationship with another configuration item; a discovery section that detects information on configuration items; a determining section that determines, from the information detected by the determining section, association of a first configuration item with a second configuration item, and association of the first configuration item with a third configuration item; and a data creating section that creates, from one set of data of the first configuration item, one subset of data (hereinafter called "one common data") including an attribute common to an attribute of the first configuration item associated with the second configuration item and an attribute of the first configuration item associated with the third configuration item and plural subsets of data (hereinafter called "plural derived data") including an attribute which is not common thereto and a relationship with another configuration item, so that the common data and the plural derived data are stored in the repository. The repository may be a CMDB. The computer system can manage the common data and derived data using the CMDB.

The data creating section associates the one common data with each of the plural derived data, associates one of the plural derived data with one set of data of the second configuration item, and associates another one of the plural derived data with one set of data of the third configuration item. The first, second and third configuration items are, for example, industrial machines.

A configuration item and a relationship between the configuration item and another configuration item can be implemented by an instance of static data or an instance of the Java class (Java and all Java-based trademarks are trademarks of Sun Microsystems, Inc. in the United States, other countries, or both).

Further, the present disclosure provides a method of managing a configuration item to be associated with a plurality of other configuration items in a computer system comprising a repository that holds, for each configuration item, one set of data indicating at least one predetermined attribute of the configuration item and a relationship with another configuration item, and a discovery section that detects information on configuration items. The method causes the computer system to detect information on configuration items; determining, from the information detected by the determining section, association of a first configuration item with a second configuration item, and association of the first configuration item with a third configuration item; and create, from one set of data of the first configuration item, one subset of data (hereinafter called "one common data") including an attribute common to an attribute of the first configuration item associated with the second configuration item and an attribute of the first configuration item associated with the third configuration item, and plural subsets of data (hereinafter called "plural derived data") each including an attribute which is not common thereto and a relationship with another configuration item, so that the common data and the plural derived data are stored in the repository.

The one common data and the plural derived data are stored in the repository. The repository is preferably a CMDB. The computer system can manage the common data and derived data using the CMDB.

In a particular embodiment, the method of the present disclosure further causes the computer system to execute the further steps of associating the one common data with each of the plural derived data, associating one of the plural derived data with one set of data of the second configuration item, and associating another one of the plural derived data with one set of data of the third configuration item.

The method of the present disclosure further causes the computer system to store from the information detected by the discovery section, one set of data of the first configuration item and one set of data of the second configuration item associated with the first configuration item in the repository; and detect one set of data of the first configuration item and one set of data of the third configuration item associated with the first configuration item.

The computer system determines, from data indicating the first configuration item is associated with the second configuration item, and data indicating the first configuration item is associated with the third configuration item, that the first configuration item is associated with the second and third configuration items.

The computer system creates the one common data, first derived data for the second configuration item and second derived data for the third configuration item, and associates the one common data with the first derived data and the second derived data, associating the first derived data with one set of data of the second configuration item, and associating the second derived data with one set of data of the third configuration item.

The computer system stores the one common data, the first derived data and the second derived data in the repository.

In a particular embodiment, the step of associating the first derived data with one set of data of the second configuration item includes creating first use relationship data, the step of associating the second derived data with one set of data of the third configuration item includes creating second use relationship data, and the method further includes storing the first use relationship data and the second use relationship data in the repository.

In a particular embodiment, an administrator defines in each attribute of the one common data, the first derived data and one set of data of the second configuration item can access the one common data, the first derived data and one set of data of the second configuration item, and an administrator defines in each attribute of the one common data, the second derived data and one set of data of the third configuration item can access the one common data, the second derived data and one set of data of the third configuration item.

The system can allow an administrator defined in an attribute of one set of data of the first configuration item to access the one common data, one set of data of the second configuration item and one set of data of the third configuration item.

The present disclosure provides a computer program for use in a computer system comprising a repository that holds, for each configuration item, one set of data indicating at least one predetermined attribute of the configuration item and a relationship with another configuration item, and a discovery section that detects information on configuration items. The computer program includes code that causes the computer system to execute the above steps for managing a configuration item to be associated with a plurality of other configuration items. The repository may be a CMDB. The computer system can manage the common data and the plural derived data using the CMDB.

Further, the second configuration item and the third configuration item may be the same device.

According to the present disclosure, the one common data and the plural derived data are stored in the repository, which may be a CMDB. Further, the one common data is associated with each of the plural derived data, one of the plural derived data is associated with one set of data of the second configuration item, and another one of the plural derived data is associated with one set of data of the third configuration item. Those associations allow the computer system to manage one set of data of a configuration item (configuration item to be shared), which is associated with a plurality of other configuration items, on the computer system. In addition, it is possible to restrict access to the common data and derived data, according to the attribute values of the common data and derived data, so that privacy security of configuration items can be secured.

BRIEF DESCRIPTION OF THE DRAWINGS

FIG. 2B shows a data model, a discovery instance, CI instance and relationship model;

DETAILED DESCRIPTION

Figure 1:
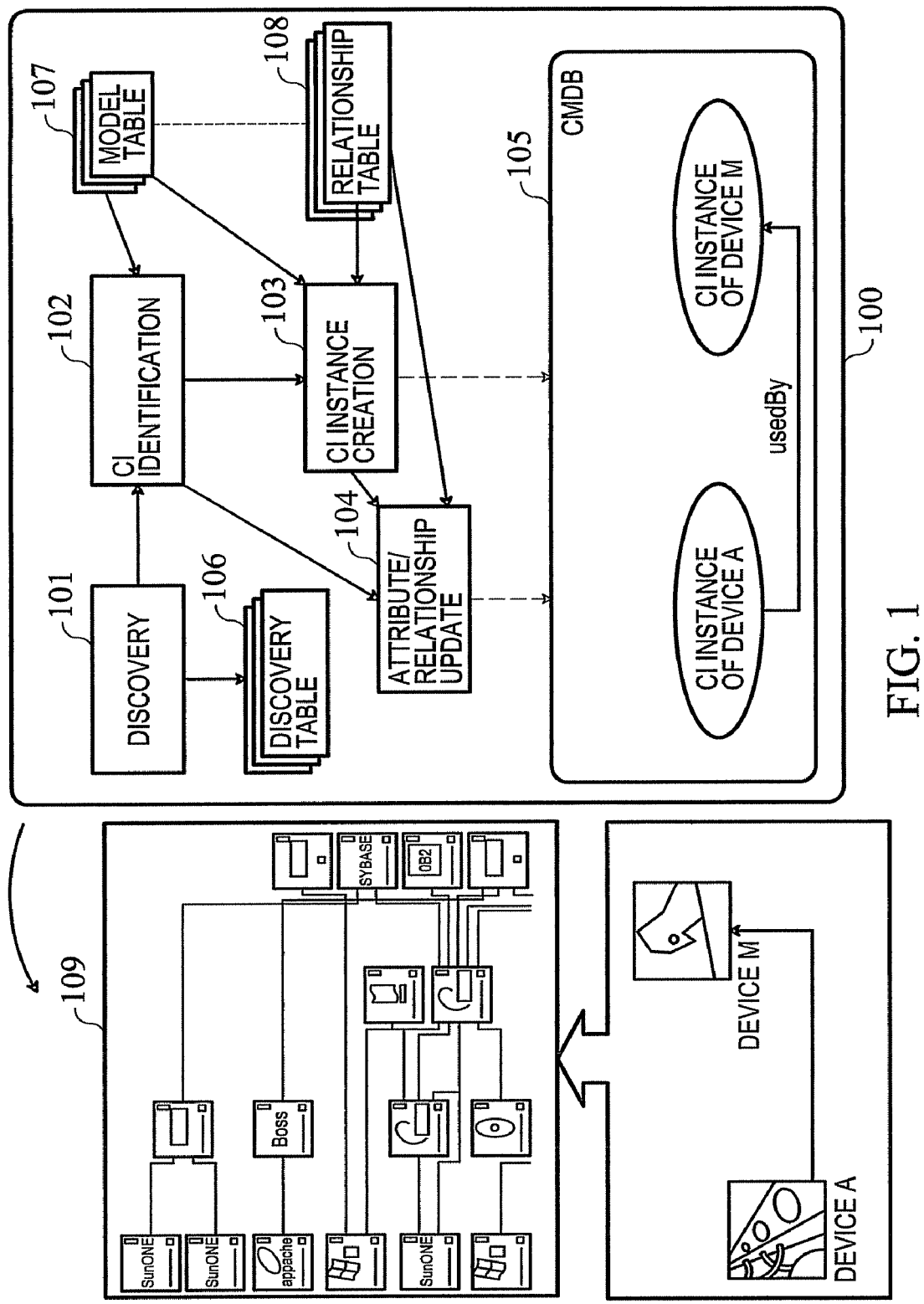
FIG. 1 shows an example of a computer system including a CMDB.

According to the present disclosure, a repository holds, for each configuration item, one set of data indicating at least one predetermined attribute of the configuration item and a relationship with another configuration item. While the repository is not particularly limited as long as it holds such a set of data, in a preferred embodiment, it is a CMDB recording section for recording a CMDB. Basic terms on CMDB will be described below.

Configuration Item (CI): CI is a basic unit to be managed by the IT service management. CIs include, for example, system resources including hardware and software, facilities needed to provide an IT service, documents, such as a rule book, procedures document and configuration diagrams on the management of the IT service, services like maintenance information, processes, and human resources.

Configuration Management Database (CMDB): A CMDB is a database for recording a predetermined attribute of each CI and a relationship with another CI. The CMDB is the core of the configuration management of the ITIL framework. While the CMDB is conceptually a database, it can take the form of a database system or a spreadsheet of spreadsheet software in a physical sense. The use of a CMDB may make it easier for an administrator to understand a relationship between CIs.

Configuration Item Instance (CI Instance): A CI instance is data corresponding to a CI. Each CI instance is represented as an instance of a data model on a CMDB. An example of a CI instance is an instance of static data or an instance of the Java class. An implemented instance of the Java class is stored in the CMDB by a scheme of persistently storing an instance of the Java class called, for example, Java Data Objects (JDO). Even when a computer system is powered off, therefore, the created instance of the Java class does not vanish, and is read out from a storage device like a hard disk and deployed in a main memory to become an instance of the Java class which can be changed or deleted by a Java program when the computer system is powered on next. In the following, some explanation will be given on an assumption that a CI is implemented as an instance in a CMDB.

Data Model: A data model is a schema for defining a CI, and is an information model which provides consistent definitions of CIs to be managed and a relationship between those CIs. Specifically, a data model defines a predetermined attribute of a CI and a relationship with another CI (manufacturing apparatus, process or the like). An example of a data model is a data model for a configuration management database "CDM" advocated by IBM. A CDM is implemented based on, for example, the Unified Modeling Language (UML).

Attributes: An attribute specifies an individual CI and explains the CI at the time of managing the CI. The following are available attributes, which are not restrictive: the name of a CI (general name of a CI, such as a server, client or firewall), product number (ID) (number which individually identifies a specific entity of a CI, such as a serial number or production number), category (category of a CI, such as hardware, software or document), type (detailed description of a CI further elaborating the category), model number (model number of a CI named by a supplier), guarantee period (guarantee period given by a CI supplier), version number (version number of a CI), location (location where a CI is present, e.g., site of a PC, archive of software, storage place for media, site where a service is provided), owner (name of a CI administrator), administration start date (date on which the owner has become the CI administrator), supplier (CI developer or provider), license (license number, the number of licenses or the like), supplied date (date on which a CI has been supplied to an organization), acceptance date (date on which a CI has been accepted by an organization), use start date (date on which the use of a CI has started), CI status (current status, e.g., operating, testing or failing status, or a future status like status of a scheduled CI), and status of a CI instance (valid or invalid of a CI instance).

Relationship: A relationship represents a relationship between CIs. A relationship, like a CI, can be defined by a data model. Examples of relationships are assigns, canConnect, canUse, connectAt, connects, controls, deployedOn, Located, Managed, Owned, provides, runAt, uses, and usedBy.

An embodiment of the present invention will be described below with reference to the accompanying drawings. It is to be understood that the embodiment is to be considered as illustrative of a preferred embodiment or aspect of the invention and the invention is not to be limited to the details given herein. Same reference numerals denote same components or parts throughout the diagrams unless otherwise specified.

FIG. 1 shows an example of a computer system 100 including a CMDB for managing CIs (e.g., device A and device M). Computer system 100 comprises a discovery section 101, a CI identifying section 102, a CI instance creating section 103, an attribute/relationship update section 104 and a CMDB 105. The discovery section, the CI identifying section, the CI instance creating section, the attribute/relationship update section and the CMDB may be implemented on a single computer or distributively implemented on a plurality of computers. Computer system 100 further comprises at least one discovery table 106, at least one model table 107 and at least one relationship table 108. Those tables may be implemented on a single computer or distributively implemented on a plurality of computers.

FIG. 1 also shows an example of a screen 109 of a TADDM console. The screen shows CIs and a connection relationship thereamong. The CIs and a connection relationship thereamong displayed on the screen are merely an example, and are not to show all CIs to be managed and a relationship thereamong.

Discovery section 101 detects (or discovers) information on a CI to be managed in the CMDB. Computer system 100 may have a plurality of discovery sections 101. Managed targets may be connected to the computer system over a network. The network can be cable connection or wireless connection. An administrator of the computer system can arbitrarily set a target to be detected. The range of the detection can be designated by a domain name, an IP address, a MAC address, a device identifier, or a database name, or any combination thereof. When a CI to be managed is an industrial device, for example, information on the industrial device is detected. The detected information may be information on a new CI, or an updated attribute or relationship value of an existing CI. A "new CI" is a CI which is detected by discovery section 101 but has not been registered with CMDB 105 yet. An "existing CI" is a CI whose instance has already been registered with CMDB 105. Discovery section 101 detects information on a CI according to discovery information 202 (e.g., A-Discovery in FIG. 2B) stored in discovery table 106. Which discovery information is to be used is designated by a discovery scheme in a data model 201 (FIG. 2B). Discovery section 101 passes the detected CI information to CI identifying section 102.

CI identifying section 102 receives the CI information from discovery section 101, and executes a process on the detection result. CI identifying section 102 refers to CMDB 105 and determines whether the CI information is information on a new CI or an updated attribute or relationship value of an existing CI. The determination is carried out by, for example, comparing the instance name of a CI stored in the CMDB with the CI information. If it is determined that the CI information relates to a new CI, CI identifying section 102 passes the information to CI instance creating section 103. On the other hand, if it is determined that the CI information is an updated attribute or relationship value of an existing CI, CI identifying section 102 passes the information to attribute/ relationship update section 104.

Figure 2A:
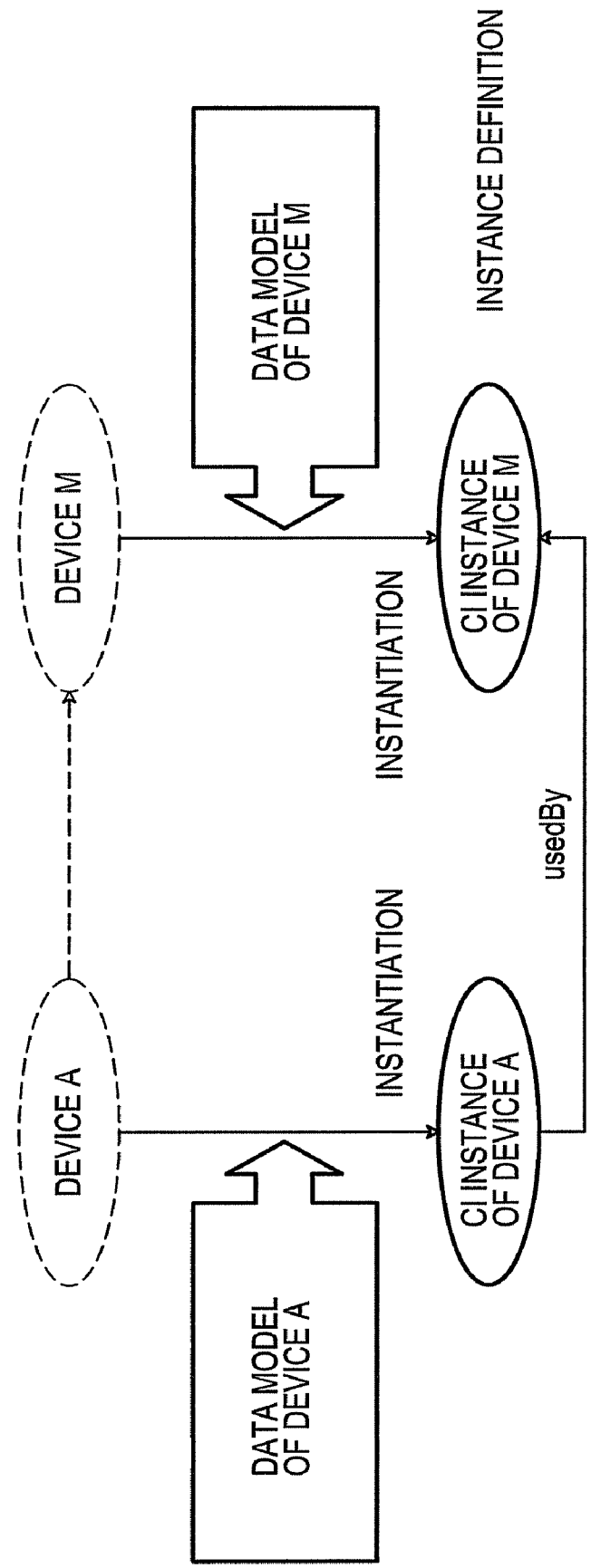
FIG. 2A shows CI instances of a device A and device M and a relationship instance therebetween.

CI instance creating section 103 creates, from the information on the CI, one set of data indicating a predetermined attribute of the CI and a relationship with another CI, according to data model 201 (FIG. 2B) stored in model table 107 and a relationship model 204 (FIG. 2B) stored in relationship table 108. The one set of data is instantiated based on the CI information detected by discovery section 101 or CI information manually input (see FIG. 2A). The one set of data can be implemented by an instance of static data or an instance of the Java class. An example of the one set of data is a CI instance. An example of a CI instance is shown in FIG. 2B (203). The one set of data is stored in CMDB 105. The one set of data may have an attribute and a relationship in a CI instance 203, or may have an attribute in a CI instance and a relationship instance separately stored in CMDB 105. In the latter case, the CI instance has a link to specify a pertinent relationship instance.

Attribute/relationship update section 104 implements tracking together with discovery section 101. Attribute/relationship update section 104 reflects an updated attribute or relationship value of a CI in its CI instance stored in the CMDB. That is, the attribute or relationship value of the CI instance of the CI is updated. The update is carried out by replacing the value with the CI information detected by discovery section 101. In the replacement, all the attribute or relationship values of a CI may be replaced with the CI information detected by discovery section 101, or only different values may be replaced. CMDB 105 records a CI instance 203 (FIG. 2B) of a CI.

Discovery table 106 stores discovery information 202 (FIG. 2B). The discovery information is used at the time discovery section 101 detects information on a CI. Discovery information 202 (FIG. 2B) can be implemented by an instance of static data or an instance of the Java class. The discovery information is also called discovery policy. Discovery information 202 (FIG. 2B) includes the search range of discovery section 101 or the collection target (scope) which is the search range for CIs, attributes to be collected and relationships to be collected (see FIG. 2B). The collection target can be designated by using, for example, a subnet IP address, the range of IP addresses, an individual IP address, a MAC address, a device identifier, a host name or a database name, or a combination thereof. As another embodiment, the collection target may be a schedule management database (not shown) connected to computer system 100 over a network. The schedule management database stores, for example, data on the process management that uses a device. As still another embodiment, the collection target may be a database (not shown) for storing a batch process definition file. When the collection target is a database for storing a batch process definition file, discovery section 101 performs detection by reading the contents of the batch process definition file. The batch process definition file stores data indicating, for example, in what order devices are to be used.

Model table 107 stores a data model 201 (FIG. 2B). The data model is used at the time CI instance creating section 103 creates one set of data indicating a predetermined attribute of the CI and a relationship with another CI.

Relationship table 108 stores a relationship model 204 (FIG. 2B). The relationship model is used at the time CI instance creating section 103 creates one set of data indicating a predetermined attribute of the CI and a relationship with another CI.

FIG. 1 shows that discovery section 101 has detected a CI connected to computer system 100 over a network, and has detected information on a device A, a device M which uses device A, and a relationship between these devices. Next, CI identifying section 102 determines if a CI instance is to be created, and if so, it creates a CI instance of device A, a CI instance of device M, and an instance of a relationship therebetween (usedBy). CI instance creating section 103 stores the created individual instances in CMDB 105.

FIG. 2A shows creation of CI instances of CIs (e.g., device A and device M), and an instance of a relationship therebetween (usedBy). The CI instance of device A is created by CI instance creating section 103, from information on device A detected by discovery section 101, using the data model of device A. Likewise, the CI instance of device M is created by CI instance creating section 103, from information on device M detected by discovery section 101, using the data model of device M. The data models of device A and device B are stored in model table 107 (FIG. 1). The instance of the relationship between CIs, namely the relationship between device A and device M (usedby) is created by CI instance creating section 103, from information on device A, detected by discovery section 101, according to the relationship model. The relationship model is stored in relationship table 108. As mentioned above, FIGS. 2A and 2B show that the CI instance of device M is created by using the data model of device M. It is to be noted however that when devices to be instantiated using the data model of device M are devices M1, M2 and M3, for example, individual information on devices M1, M2, M3 are instantiated using the data model of device M, thereby creating the CI instance of device M1, the CI instance of device M2 and the CI instance of device M3. The CI instances of devices M1, M2, M3 are also stored in CMDB 105.

FIG. 2B shows data model 201 stored in model table 107 (FIG. 1), discovery instance 202 stored in discovery table 106 (FIG. 1), CI instance 203 (of device A) stored in CMDB 105 (FIG. 1), and relationship model 204 stored in relationship table 108 (FIG. 1).

Data model 201 is a schema for defining a CI. Data model 201 includes descriptions of "model name" indicating which CI has a model in question, "model attribute" indicating an attribute of a CI designated by the model name, "relationship" that the CI designated by the model name and another CI can have, and "discovery scheme" that specifies a discovery instance for detecting the CI designated by the model name. The model attribute may be defined according to, for example, an attribute defined by the configuration management database data model "CDM" advocated by IBM, but is not restrictive thereto. In the CDM, 2609 different attributes are defined. The administrator of the CMDB can arbitrarily designate an attribute in data model 201. The relationship may be defined according to, for example, a relationship defined in the CDM, but is not restrictive thereto. In the CDM, 57 different relationships are defined. The discovery scheme can be specified by a discovery instance name. The discovery instance name is A-Discovery in the case of FIG. 2B.

Discovery instance 202 includes descriptions of "name" of a discovery instance specified by the discovery scheme of data model 201, "collection target (scope)" of a managed target (CI) to be collected by discovery section 101, "attribute to be collected" and "relationships to be collected" of the managed target (CI) to be collected by discovery section 101, and "status" indicating whether the discovery instance is active or inactive.

CI instance 203 includes descriptions of "instance name" for specifying which CI has the instance, "model name" indicating which data model is used to create the instance, and "attribute value" of each attribute specified by the data model, a description (value) of each "relationship" specified by the data model, and descriptions of "status" indicating whether the instance is active or inactive, and "creation date" on which the CI instance has been created. The CI instance preferably further includes a CI instance identifier specific to the CI instance. The CI instance identifier is not particularly restrictive as long as it can distinguish the CI instance from another CI instance; for example, the CI instance identifier can be a combination of a host name, and a serial number or another attribute which is a constant value. CI instance 203 in FIG. 2B indicates that it is the CI instance of device A; it is instantiated by using data model A; it includes attribute values of S, T and U; as relationships, it is used by M (usedBy: M), is connected to E (connectAt: E), and is executed by H (runAt: H); and it is active and indicates data of its creation date.

Relationship model 204 is a schema for defining a relationship to be specified by data model 201. Relationship model 204 includes descriptions of "relationship name" such as usedBy, "target data model" for specifying a data model to be a target for the relationship, and "description" of the relationship.

Figure 3:
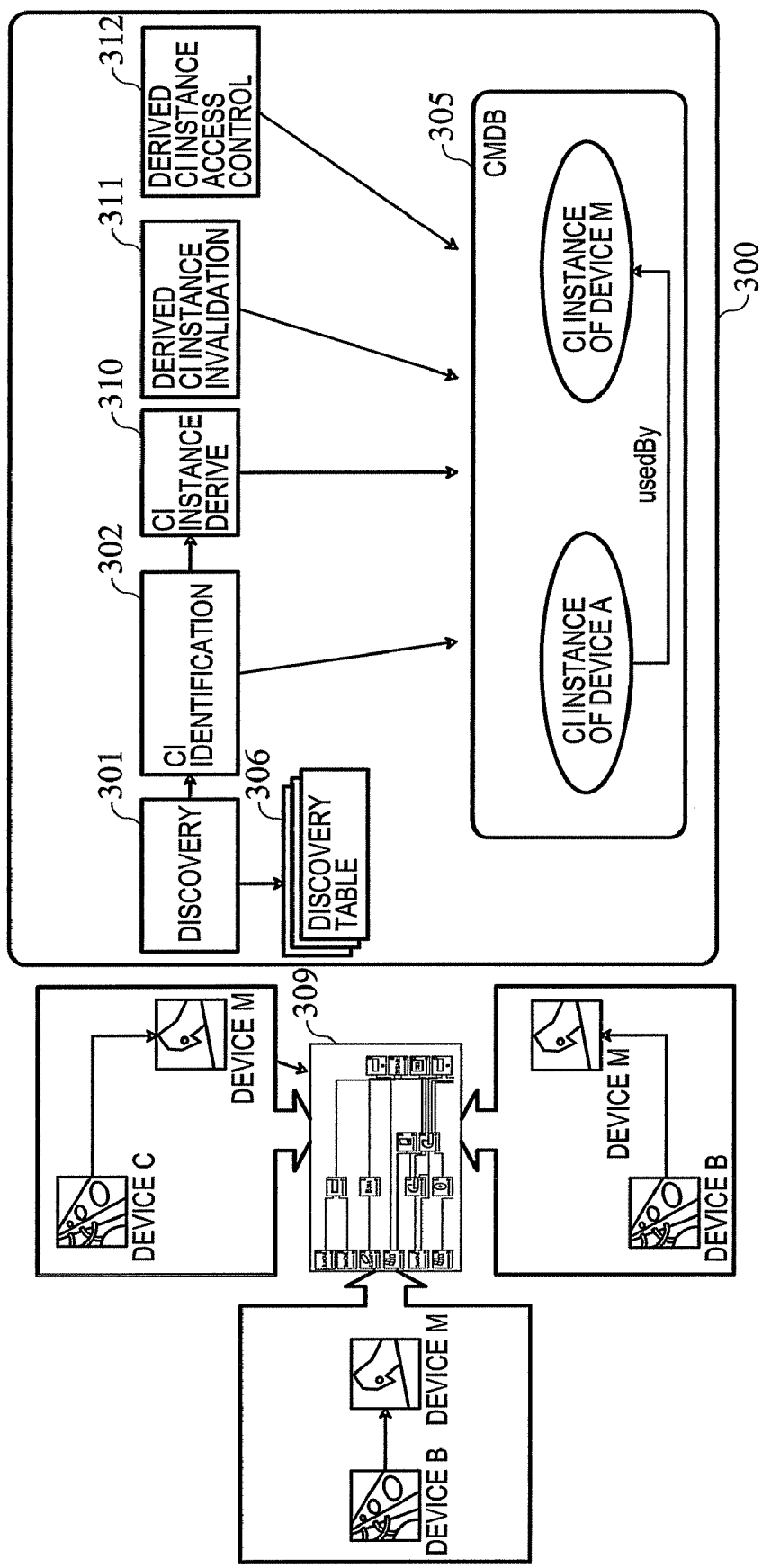
FIG. 3 shows an example of a computer system for managing a shared device using a CMDB.

FIG. 3 shows an example of a computer system 300 according to an embodiment of the present invention, which is adapted for managing a shared device using a CMDB. Specifically, FIG. 3 shows that a device A, a device B, a device C, and a device M which is shared by devices A, B and C are managed by using CMDB 305. Omitted from FIG. 3 are CI instance creating section 103, attribute/relationship update section 104, model table 107 and relationship table 108 shown in FIG. 1.

A discovery section 301 detects information on a device to be managed which is connected to computer system 300 over a network. As a result, discovery section 301 detects information on device A, device M which is used by device A, and the relationship between those devices. Next, a CI identifying section 302 refers to CMDB 305 and determines whether the information relates to a new CI. If so, CI instance creating section 103 creates a CI instance of device A, a CI instance of device M, and an instance of the relationship between those devices (usedBy). CI instance creating section 103 then stores the individual instances in CMDB 305.

Discovery section 301 further detects information on a device to be managed which is connected to computer system 300 over a network. The detection interval can be set arbitrarily by an administrator of the computer system. The detection interval may be one day, one week, one month or the like.

Consequently, discovery section 301 detects information on device B, device M which is used by device B, and the relationship therebetween, and information on device C, device M which is used by device C, and the relationship therebetween. The information on device B, device M which is used by device B, and the relationship therebetween is newly detected information in a case where device B is currently using device M. Further, the information on device C, device M which is used by device C, and the relationship therebetween is newly detected information in a case where device C is scheduled to use device M.

Discovery section 301 passes the information on detected device B and device M which is used by device B, and the relationship therebetween to CI identifying section 302.

CI identifying section 302 receives the information from discovery section 301, and determines whether the information fulfills an identification condition defined for each CI data model. When the information does not fulfill the identification condition, CI identifying section 302 determines that a single device M is associated with each of device A and device B. When the information fulfills the identification condition, on the other hand, CI identifying section 302 determines that a single device M is not associated with each of device A and device B. In the embodiment, the expression "device M is associated with device A and device B" encompasses a situation where a single device M is shared by device A and device B. Hereinafter, the process of CI identifying section 302 for determining whether an identification condition is fulfilled will be called a CI identification process occasionally. The identification condition is stored in, for example, a non-volatile memory device (not shown) in computer system 300. For example, the identification condition in the above case is "whether a CI instance already registered with CMDB 305 and information on the detected CI have a common attribute value". The details of the identification condition will be discussed below with reference to FIG. 4.

When it is determined that device M is shared by a plurality of devices (i.e., device A and device B), CI identifying section 302 refers to CMDB 305 and determines whether the CI instance of device M has already been derived. The determination is made by checking, for example, if the derived CI instance of device M is already stored in CMDB 305.

When the derived CI instance of device M has not been derived yet, a CI instance deriving section 310 creates, from the CI instance of device M already registered in CMDB 305, one common data and plural derived data which correspond in number to the number of devices sharing device M (two or device A and device B in the above case). Hereinafter, the process of creating one common data and plural derived data from the CI instance will be called a CI instance deriving process occasionally. Common data and derived data can be implemented by an instance of static data or an instance of the Java class. Hereinafter, common data may be called a common CI instance, and derived data may be called a derived CI instance occasionally. The details of the derive process will be given below with reference to FIGS. 5A and 5B and FIGS. 6A to 6D.

Likewise, discovery section 301 passes the information on detected device C and device M which is used by device C, and the relationship therebetween to CI identifying section 302.

CI identifying section 302 receives the information from discovery section 301, and determines whether the information fulfills an identification condition defined for each CI data model. When the information does not fulfill the identification condition, CI identifying section 302 determines that a single device M is shared by both of device A and device C (it is used in future in the case of device C). For example, the identification condition in the above case is "whether a CI instance already registered with CMDB 305 and information on the detected CI have a common attribute value".

When it is determined that device M is shared by a plurality of devices (i.e., device A and device B), CI identifying section 302 refers to CMDB 305 and determines whether the CI instance of device M has already been derived.

When the derived CI instance of device M has not been derived yet, CI instance deriving section 310 creates, from the CI instance of device M already registered in CMDB 305, one common data and plural derived data which correspond in number to the number of devices sharing device M (two or device A and device C in the above case). On the other hand, when it is determined that the derived CI instance of device M has already been derived, CI instance deriving section 310 creates the derived CI instance of device C.

A derived CI instance invalidating unit 311 performs an invalidation or deletion process on a derived CI instance which does not need to be kept any longer. Derived CI instance invalidating unit 311 combines derived CI instances as needed. The criteria for determining the invalidation or deletion process of a derived CI instance will be described below with the derived CI instance of device M being taken as an example.

(1) Case where all or all except one of CI instances relating to the derived CI instance of device M have been invalidated. For example, it is a case where all or all except one of the CI instances of device A, device B and device C have been invalidated.

(2) Case where all or all except one of relationships to the derived CI instance of device M have been invalidated. For example, it is a case where all or all except one of the relationships between device M and device A, the relationships between device M and device B, and the relationships between device M and device C have been invalidated.

(3) Case where a system administrator or the like has requested invalidation of the derived CI instance of device M. Invalidation includes immediate invalidation or invalidation at a designated time.

Invalidation of a derived CI instance is carried out by, for example, setting the status attribute of the derived CI instance inactive. Deletion of a derived CI instance is carried out by deleting the derived CI instance from CMDB 305.

Derived CI instance invalidating unit 311 performs a process of restoring a common CI instance and a derived CI instance to the original CI instance as needed. Specifically, when it becomes unnecessary to manage a derived CI instance, derived CI instance invalidating unit 311 replaces a link to the derived CI instance, which is defined in the attribute of the common CI instance, with the attribute value of the attribute of the derived CI instance to restore the derived CI instance to the original CI instance.

A derived CI instance access controller 312 controls access to a derived CI instance according to the derived CI instance or a relationship between the devices. The access control allows a user system to control an operational access to a CI, such as writing, reading or retrieval. The details of the access control will be described below with reference to FIG. 7.

Figure 4A:
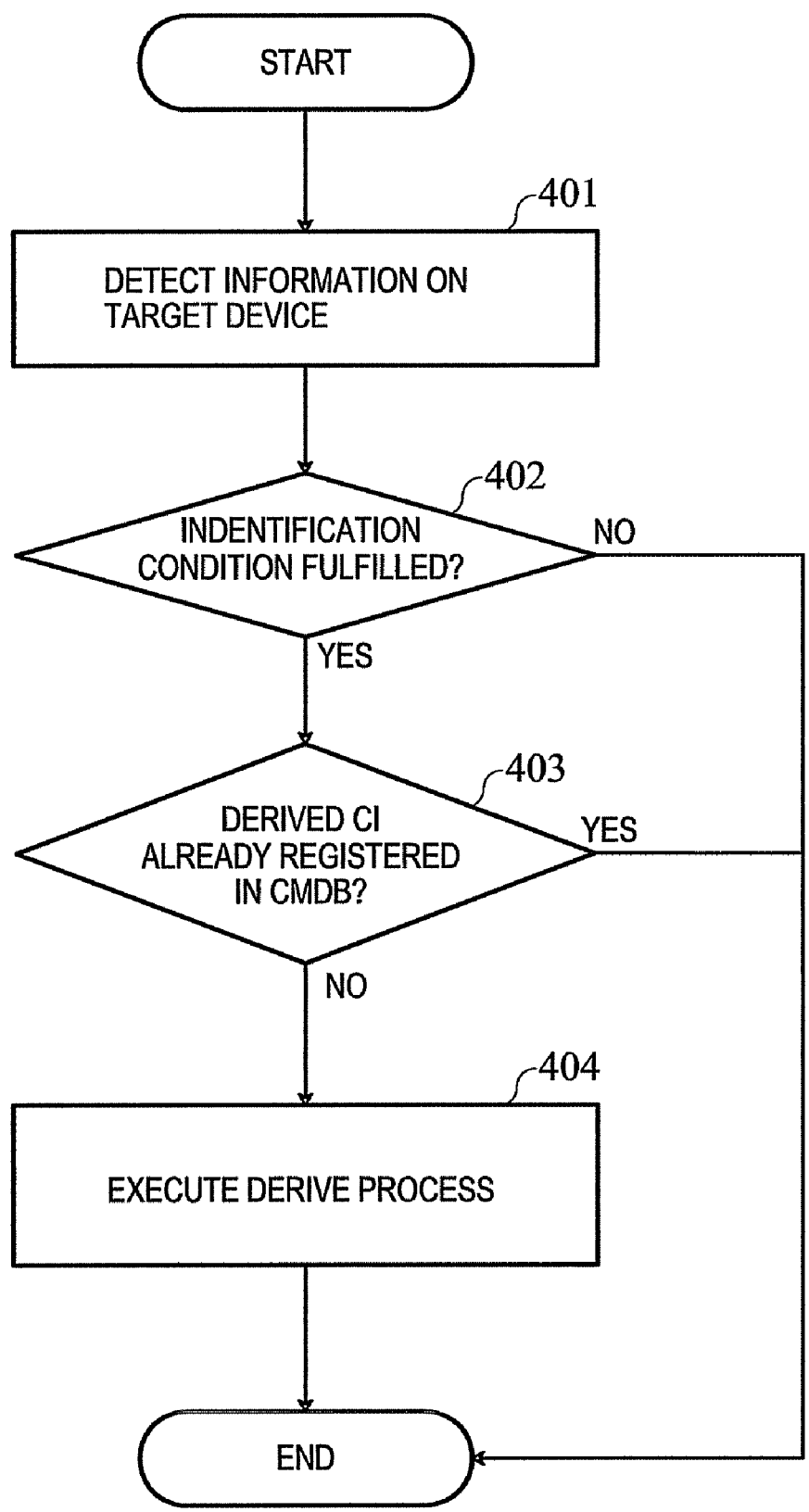
FIG. 4A shows the flow of a CI identification process and a CI instance derive process.

FIG. 4A shows the flow of a CI identification process and a derive process of a CI instance in an example where a single device is shared by a plurality of devices. Discovery section 301 (FIG. 3) detects information on a device to be managed which is connected to computer system 300 (FIG. 3) over a network (step 401). Next, CI identifying section 302 (FIG. 3) receives the information on the CI from discovery section 301 (FIG. 3), and determines whether the information fulfills the identification condition (step 402). When the information does not fulfill the identification condition (No), CI identifying section 302 (FIG. 3) terminates the identification process. When the information fulfills the identification condition (Yes), on the other hand, CI identifying section 302 (FIG. 3) determines whether derived data created in the derive process (derived CI instance of device M in the case of FIG. 3) has already been registered with CMDB 305 (FIG. 3) (step 403). When the derived data has already been registered with CMDB 305 (FIG. 3) (Yes), CI identifying section 302 (FIG. 3) terminates the identification process. When the derived data has not been registered with CMDB 305 (FIG. 3) (No), on the other hand, CI identifying section 302 (FIG. 3) turns the process over to CI instance deriving section 310 (FIG. 3). CI instance deriving section 310 (FIG. 3) then performs a CI instance derive process (step 404).

Figure 4B:
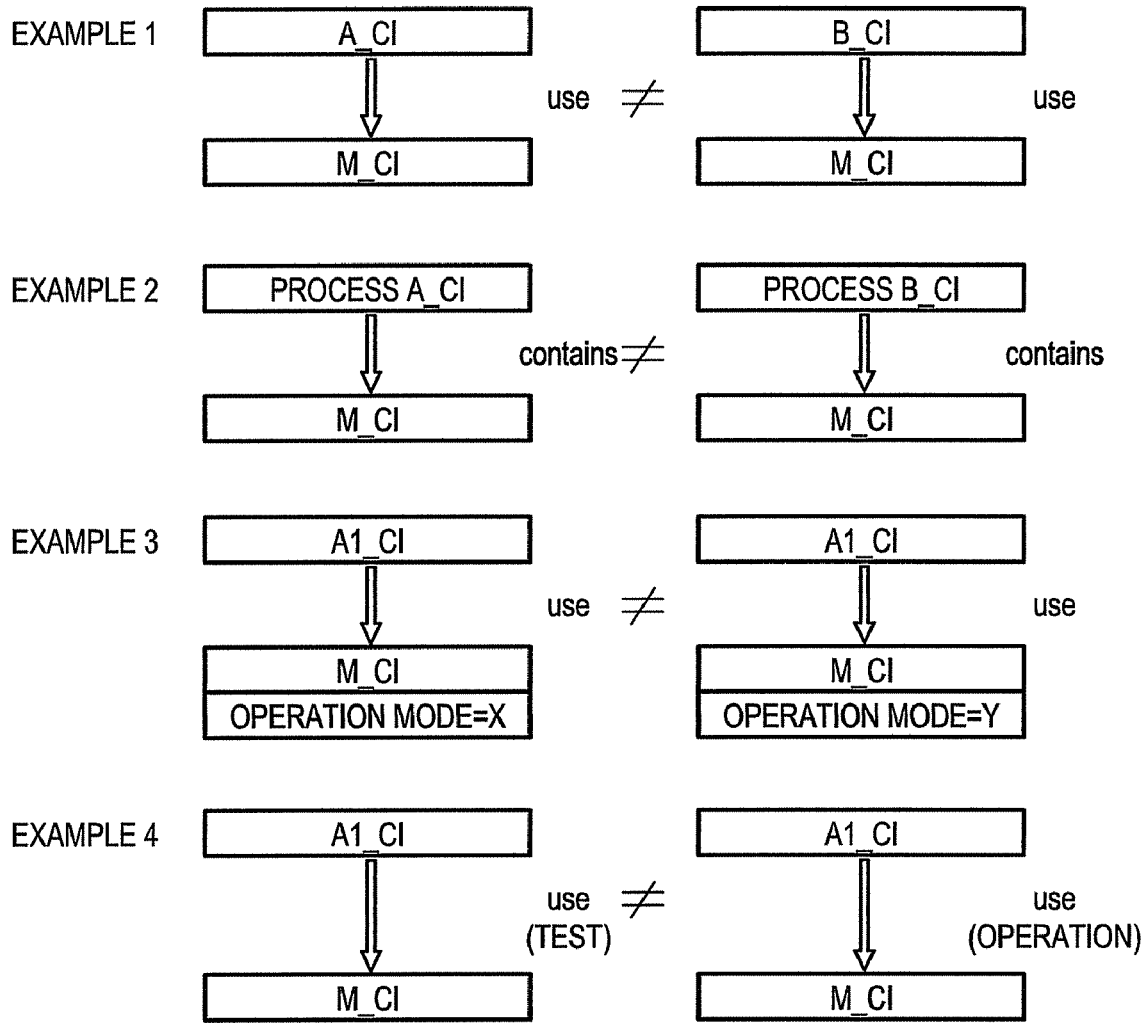
FIG. 4B shows an example of an identification condition.

FIG. 4B exemplifies an identification condition for device M as an example. The identification condition is used by CI identifying section 302 (FIG. 3) to determine whether one common data and derived data which correspond in number to the number of devices sharing device M are to be created from the CI instance of device M already registered with CMDB 305 (FIG. 3).

An example of the identification condition is "whether at least one of attribute and relationship values of the CIs of the devices, already registered with CMDB 305, differs from information detected by the discovery section". A plurality of identification conditions may be combined.

Example 1 of the identification condition in FIG. 4B is that different two devices (A, B) use a single device (M). In the case of Example 1, the attribute value of the CI instance of the single device (M) associated with one (A) of the two devices indicates that the single device (M) is used by that one (A) of the two devices, and information on the single device (M) associated with the other one (B) of the two devices indicates that the single device (M) is used by the other device (B). Alternatively, in the case of Example 1, the relationship of the CI instance of the single device (M) associated with one (A) of the two devices indicates association with that one (A) of the two devices, and the relationship of the single device (M) associated with the other one (B) of the two devices indicates that association with the other device (B). In this case, the attribute value of the CI instance of device M associated with device A differs from the information on device M associated with device B, or the relationship between the CI instance of device M, associated with device A, and another instance differs from the information on device M associated with device B. Therefore, the identification condition is fulfilled, so that CI identifying section 302 (FIG. 3) determines that device M is shared by device A and device B. Example 1 corresponds to a situation in FIG. 3 where CI identifying section 302 determines, from information detected by discovery section 301, that device M (first configuration item) is shared by device A (second configuration item) and device B (third configuration item).

Example 2 of the identification condition in FIG. 4B is that different two processes (A, B) contain the same device (M). In the case of Example 2, the attribute value of the CI instance of the single device (M) associated with one (A) of the two processes indicates that the single device (M) is contained in that one (A) of the two processes, and information on the single device (M) associated with the other one (B) of the two processes indicates that the single device (M) is contained in the other process (B). Alternatively, in the case of Example 2, the relationship of the CI instance of the single device (M) associated with one (A) of the two processes indicates association with that one (A) of the two processes, and the relationship of the single device (M) associated with the other one (B) of the two processes indicates that association with the other one process (B). In this case, the attribute value of the CI instance of device M associated with process A differs from the information on device M associated with process B, or the relationship between the CI instance of device M, associated with process A, and another instance differs from the information on device M associated with process B. Therefore, the identification condition is fulfilled, so that CI identifying section 302 (FIG. 3) determines that device M is shared by process A and process B.

Example 3 of the identification condition in FIG. 4B is a case where a single device (A) uses a single device (M), but the attribute "operation modes" (X, Y) of the CI instance of the single device (M) differ from each other. This example can occur when the CI instance of device M having an attribute value of the operation mode X is already stored in CMDB 305 (FIG. 3), and information on the device M having the attribute value of the operation mode Y is further detected by discovery section 301 (FIG. 3). In this case, the attribute value (operation mode X) of the CI instance of device M (stored in the CMDB) differs from the information (operation mode Y) on device M (detected by the discovery section). Therefore, the identification condition is fulfilled, so that CI identifying section 302 (FIG. 3) determines that the single device M is shared by device A (based on data stored in the CMDB) and device A (based on the information detected by the discovery section). Apparently, it can be said that such determination indicates that device M is shared by the same CI or device A. The present disclosure encompasses such an embodiment.

Example 4 of the identification condition in FIG. 4B is a case where a single device (A) is associated with a single device (M), but the relationships of the single device M with another CI (test, operation) differ from each other. This example can occur when the relationship (test) between device M and device A is already stored in CMDB 305 (FIG. 3), and the relationship (operation) between device M and device A is further detected by discovery section 301 (FIG. 3). In this case, the relationship (test) between device M and device A (stored in the CMDB) differs from the relationship (operation) between device M and device A (detected by the discovery section). Therefore, the identification condition is fulfilled, so that CI identifying section 302 (FIG. 3) determines that the single device M is shared by device A (based on data stored in the CMDB) and device A (based on the information detected by the discovery section). Apparently, it can be said that such determination indicates that device M is shared by the same CI or device A. The present disclosure encompasses such an embodiment.

Figure 5A:
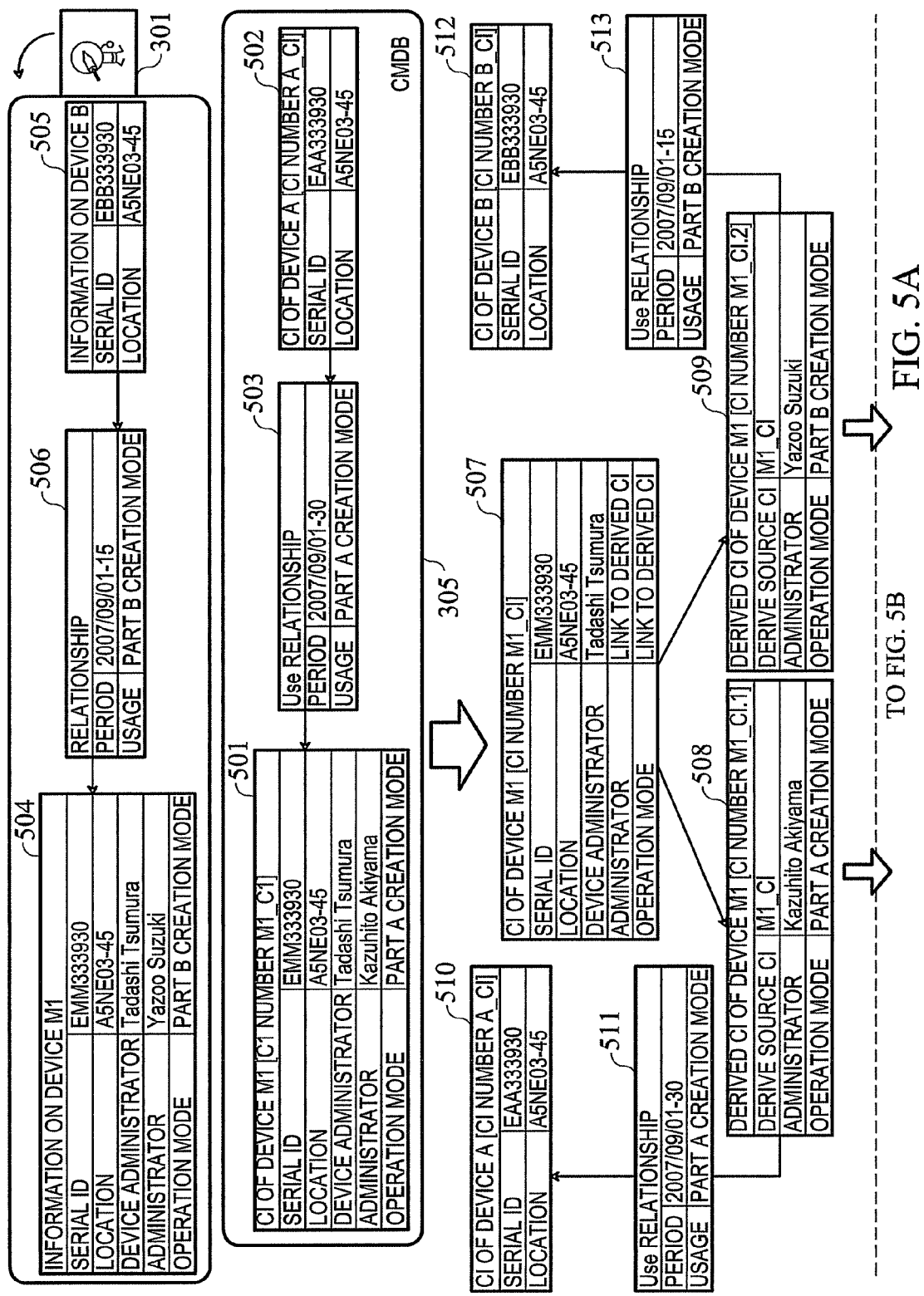
FIG. 5A shows the outline (½) of a process of deriving the CI instance of a device M1.
Figure 5B:
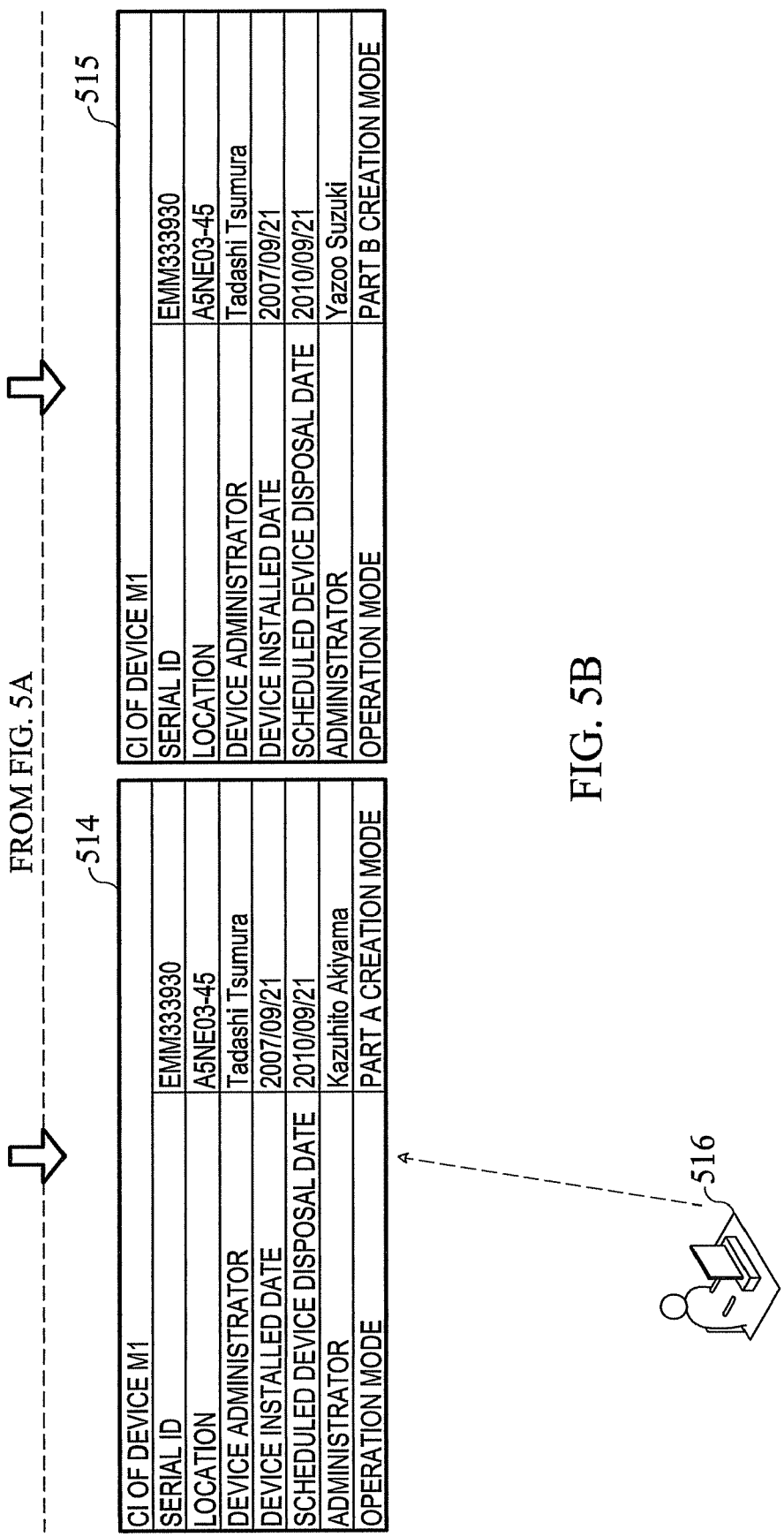
FIG. 5B shows the outline (2/2) of the process of deriving the CI instance of a device M1.

FIGS. 5A and 5B show the outline of a CI instance derive process taking the CI instance of device M1 as an example. Discovery section 301 detects information on a device to be managed which is connected to computer system 300 (FIG. 3) over a network. As a result, discovery section 301 detects information on device A, device M which is used by device A, and the relationship between those devices. Next, CI identifying section 302 (FIG. 3) refers to CMDB 305 and determines whether the information relates to a new CI. When the information relates to a new CI, CI instance creating section 103 (FIG. 1) creates a CI instance of device A, a CI instance of device M, and an instance of the relationship between those devices (usedBy). CI instance creating section 103 then stores the individual instances in CMDB 305. Discovery section 301 further detects information on a device to be managed. Consequently, discovery section 301 detects information 504 on device M1, information 505 on device B, and information 506 on the relationship between those devices. A CI instance 501 of device M1 has, as attributes, "serial ID" of device M1, "location" or the installed location of device M1, "device administrator" who is in charge of device M1 itself, "administrator" who is an administrative person in charge at the time of using device M1, and "operation mode" of device M.

In FIG. 5A, the single device M1 is shared by device A and device B. When the sharing of device M1 is determined, the shared state of device M1 cannot be represented by one of the CI instances 501 of device M1. Accordingly, CI instance deriving section 310 (FIG. 3) compares each of the attribute values of CI instances 501 of device M1 already stored in CMDB 305 with information 504 on device M1, determines that the attributes are common when the attribute values of the same attribute are identical, and determines that the attributes are not common when the attribute values of the same attribute differ from each other. Alternatively, in a data model for device M, common attributes or uncommon attributes may be previously marked with, for example, a flag. Then, CI instance deriving section 310 (FIG. 3) creates, from CI instances 501 of device M1, a common CI instance (common CI instance of the device M1) 507 including an attribute having the same attribute value, and a plurality of derived CI instances (derived CI instances of device M1) 508, 509 including uncommon attributes which do not have the same attribute value. The number of the derived CI instances of device M1 corresponds to the number (two) of other configuration items or device A and device B which share device M1.

In the example of FIG. 5A, the administrator of CI instance 501 of device M1 stored in CMDB 305 is "Kazuhito Akiyama", and the operation mode is "part A creation mode". On the other hand, in the newly detected information 504 on device M1, the administrator is "Yazoo Suzuki" and the operation mode is "part B creation mode". The attribute values of the other attributes match with one another. Therefore, CI instance deriving section 310 (FIG. 3) determines that the common attributes of device M1 are the serial ID, location and device administrator, whereas the uncommon attributes are the administrator and operation mode.

Therefore, common CI instances 507 of device M1 include attributes having a common attribute value, i.e., the serial ID, location and device administrator. In a particular embodiment, common CI instance 507 of the device M1 has link data to the derived CI instances 508, 509, so that the derived CI instances are referred to for the attributes which do not have a common attribute value, i.e., the administrator and operation mode. The common CI instance uses the link data to the derived CI instances for referring to the attribute values of the uncommon attributes. Common CI instance 507 of device M1 preferably has a CI instance identifier M1_CI. In this case, the instance identifier of common CI instance 507 is identical to the identifier of CI instance 501 of device M1 stored in the CMDB. Therefore, CI instance deriving section 310 (FIG. 3) may set CI instance 501 of device M1 inactive, and set common CI instance 507 of device M1 active. Alternatively, CI instance deriving section 310 (FIG. 3) may replace CI instance 501 of device M1 with common CI instance 507 of device M1.

Derived CI instances 508, 509 of device M1 include attributes having uncommon attribute values, namely the administrator and operation mode. Each of the derived CI instances of device M1 preferably includes, as an attribute, "derive source CI" which is link data to specify the derive source CI of device M1. In a particular embodiment, the link data to the derive source CI of device M1 is a CI instance identifier M1_CI of device M1. Derived CI instances 508, 509 of device M1 respectively have a CI instance identifier M1_CI.1 and a CI instance identifier M1_CI.2. In the common CI instance, the CI instance identifier of a derived CI can be used also as link data to the derived CI instance.

CI instance deriving section 310 (FIG. 3) associates common CI instance 507 of device M1 with each of derived CI instances 508, 509. CI instance deriving section 310 (FIG. 3) associates derived CI instance 508 with a CT instance 510 of device A sharing device M. A use relationship instance 511 is used in the association. Use relationship instance 511 has, as attributes, "period" indicating a period where device A uses device M, and "usage" indicating the usage of device A and device M. Derived CI instance 509 is associated with a CI instance 512 of device B sharing device M. A use relationship instance 513 is used in the association. Use relationship instance 513 has, as attributes, "period" indicating a period where device B uses device M, and "usage" indicating the usage of device B and device M. The content of the attribute "usage" of use relationship instance 511 can be the same as the content of the attribute "operation mode" of derived CI instance 508. Likewise, the content of the attribute "usage" of use relationship instance 513 can be the same as the content of the attribute "operation mode" of derived CI instance 509. CI instance 510 of device A can include, as attributes, serial ID, location and so forth. The CI instance 510 of device A preferably has a CI instance identifier A_CI. Likewise, CI instance 512 of device B can include, as attributes, serial ID, location and so forth. CI instance 512 of device B preferably has a CI instance identifier B_CI.

FIG. 5B shows the CI instance of device M1 which administrator (Kazuhito Akiyama) 516, who is capable of accessing derived CI instance 508; can view on the administrative console. Administrator 516 can view a CI instance 514, which is a combination of common CI instance 507 and derived CI instance 508, without being conscious of the derive process on the CI instance of device M1 (i.e., transparently). It is to be noted however that as will be explained below with reference to FIG. 7, administrator 516 is not another administrator (Yazoo Suzuki) based on the attribute "administrator" of a CI instance 515, which is a combination of derived CI instance 508 and derived CI instance 509. Therefore, administrator 516 is restricted to access to derived CI instance 509, and cannot view CI instance 515 accordingly.

Figure 6A:
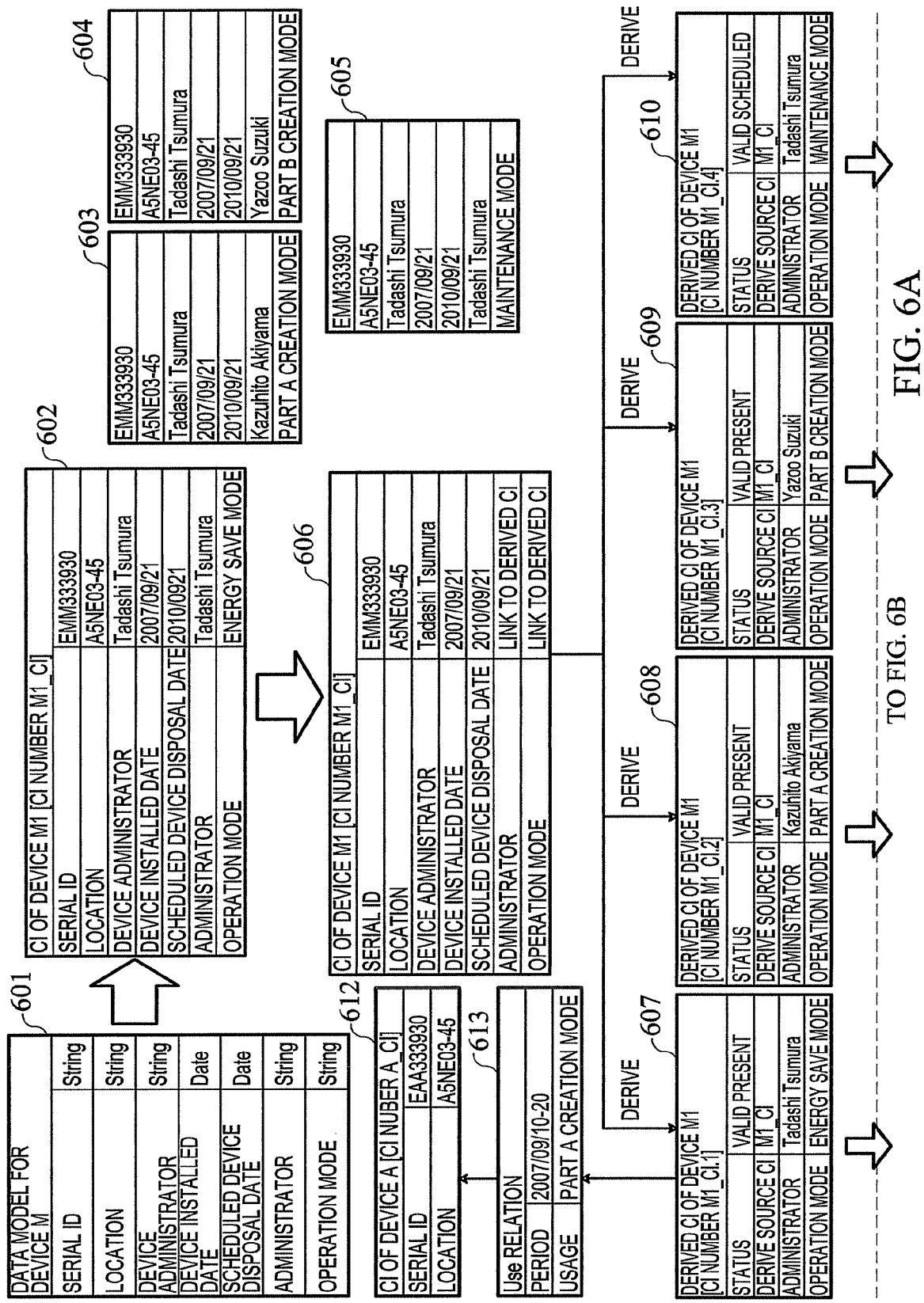
FIG. 6A shows the flow (¼) of automatic creation of a derived CI instance.

FIGS. 6A to 6D show the flow of automatic creation of a derived CI instance with the CI instance of device M1 taken as an example. FIG. 6A shows that when different information 603, 604, 605 are detected for the attributes "administrator" and "operation mode" of device M1, CI instance deriving section 310 (FIG. 3) creates, from a CI instance 602 of device M1 stored in CMDB 305 (FIG. 3), a single common CI instance (606) of device M1 and a plurality of derived CI instances 607, 608, 609, 610 of device M1.

A data model 601 for device M has, as attributes, "serial ID" of device M, "location" or the installed location of device M, "device administrator" who is in charge of device M itself, "device installed date" of device M, "scheduled device disposal date" of device M, "administrator" who is an administrative person in charge at the time of using device M, and "operation mode" of device M.

CI instance 602 of device M1 is what is instantiated by CI instance creating section 103 (FIG. 1) based on information on device M1 detected by discovery section 301 (FIG. 3), according to data model 601 for device M, and is already registered with CMDB 305 (FIG. 3). CI instance 602 of device M1 preferably has a CI instance identifier (also called CI number). The CI instance identifier of CI instance 602 of device M1 is M1_CI.

An embodiment of FIG. 6A is premised that device M1 is shared while device M1 has different operation modes (part A creation mode, part B creation mode, maintenance mode). When CI identifying section 302 (FIG. 3) determines the sharing, the shared state of device M1 cannot be represented by one of the CI instances of device M. Accordingly, CI instance deriving section 310 (FIG. 3) creates, from the CI instances of device M1, a single common CI instance (common CI instance of device M1) 606 including an attribute having the same attribute value, and a plurality of derived CI instances (derived CI instances of device M1) 607, 608, 609, 610 including uncommon attributes which do not have the same attribute value. The number of the derived CI instances of device M1 corresponds to the number of a plurality of configuration items (four) which share device M1.

Discovery section 301 continues to detect information on a device to be managed which is connected to computer system 300 (FIG. 3) over a network. As a result, discovery section 301 detects information 603, 604, 605 on device M1 of different operation modes. In CI instance 602 of device M1 stored in CMDB 305 (FIG. 3), the administrator is "Tadashi Tsumura", and the operation mode is "energy save mode". On the other hand, in the newly detected information on device M1, 1. the administrator is "Kazuhito Akiyama", and the operation mode is "part A creation mode" (603), 2. the administrator is "Yazoo Suzuki", and the operation mode is "part B creation mode" (604), and 3. the administrator is "Tadashi Tsumura", and the operation mode is "maintenance mode" (605).

A description will be given below of the derive process to be performed by CI instance deriving section 310 (FIG. 3) when discovery section 301 simultaneously detects information 603, 604, 605 on device M1 of different operation modes. The value of the administrator in CI instance 602 of device M1 stored in CMDB 305 (FIG. 3) differs from the values of the administrator in newly detected information 603, 604 on device M1 except for the case of information 605. Even in the case where the value of the administrator in the CI instance of device M1 stored in CMDB 305 (FIG. 3) is the same as the value of the administrator in newly detected information 605 on device M1, when newly detected information 603, 604, 605 on device M1 have different attribute values from each other, CI instance deriving section 310 (FIG. 3) determines that the attributes are not common. In the case of FIG. 6A, CI instance deriving section 310 (FIG. 3) determines that the attribute "administrator" is an uncommon attribute. The value of the operation mode of CI instance 602 of device M1 stored in CMDB 305 (FIG. 3) differs from the value of the operation mode of each newly detected information 603, 604, 605 on device M1. Therefore, CI instance deriving section 310 (FIG. 3) determines that the attribute "operation mode" is an uncommon attribute, and that the values of the other attributes match with one another. Therefore, CI instance deriving section 310 (FIG. 3) determines that the common attributes of device M1 are serial ID, location, device administrator, device installed date and scheduled device disposal date, and that the uncommon attributes of device M1 are the administrator and operation mode.

Therefore, common CI instance 606 of device M1 includes attributes having a common attribute value, namely, serial ID, location, device administrator, device installed date and scheduled device disposal date. In a particular embodiment, common CI instance 606 of device M1 has link data to derive CI instances 607, 608, 609, 610 of device M1, so that the derived CI instances are referred to for the attributes having uncommon attribute values, i.e., the administrator and operation mode. That is, common CI instance 606 refers to the attribute values of the uncommon attributes with the link to the derived CI instances. Common CI instance 606 of device M1 may have a CI instance identifier M1_CI. In this case, the CI instance identifier of common CI instance 606 is identical to the identifier of CI instance 602 of device M1 stored in the CMDB.

Derived CI instances 607, 608, 609, 610 of device M1 include attributes having uncommon attribute values, namely the administrator and operation mode. The derived CI instance of device M1 may include, as attributes, "status" indicating whether the derived CI instance is valid currently or valid in future, and "derive source CI" or link data to specify the derive source CI of device M1. The link data to the derive source CI of device M1 may be the CI instance identifier M1_CI of device M1. Derived CI instances 607, 608, 609, 610 of device M1 respectively have M1_CI.1, M1_CI.2, M1_CI.3 and M1_CI.4. The CI instance identifier of the derived CI can be used as link data to the derive CI instance in the common CI instance.

CI instance deriving section 310 (FIG. 3) associates common CI instance 606 of device M1 with each of derived CI instances 607, 608, 609, 610. CI instance deriving section 310 (FIG. 3) associates each derived CI instance with the CI instance of one of the devices that share device M. CI instance deriving section 310 (FIG. 3) associates derived CI instance 607 with a CI instance 612 of device A. A use relationship instance 613 is used in the association. Use relationship instance 613 has, as attributes, "period" indicating a period where device A uses device M, and "usage" indicating the usage of device A and device M. The content of the attribute "usage" of use relationship instance 613 can be the same as the content of the attribute "operation mode" of derived CI instance 607. CI instance 612 of device A can include, as attributes, serial ID, location and so forth. CI instance 612 of device A may have a CI instance identifier A_CI.

Figure 6B:
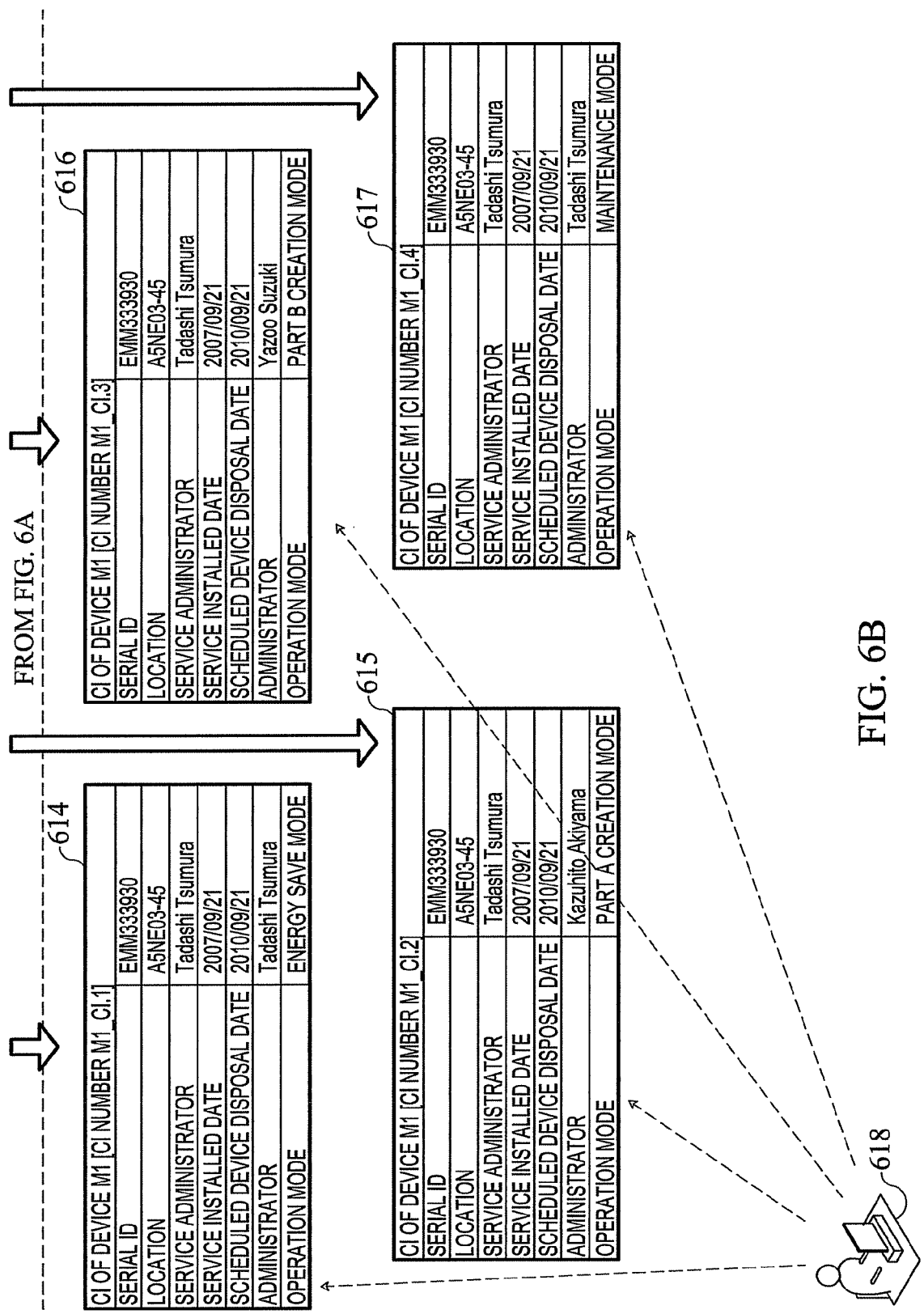
FIG. 6B shows the flow (2/4) of automatic creation of a derived CI instance.

FIG. 6B shows the CI instance of device M1 which a device administrator (Tadashi Tsumura) 618, who is capable of accessing derived CI instances 607, 608, 609, 610, can view on the administrative console. Device administrator 618 can view CI instances of device M1 as a CI instance 614 (a combination of common CI instance 606 and derived CI instance 607), a CI instance 615 (a combination of common CI instance 606 and derived CI instance 608), a CI instance 616 (a combination of common CI instance 606 and derived CI instance 609), and a CI instance 617 (a combination of common CI instance 606 and derived CI instance 610), without being conscious of the derive process on the CI instance of device M1 (i.e., transparently). On the other hand, the administrator designated by the attribute of a derived CI instance can view the combined CI instances including the derived CI instances, and CI instances relating to the combined CI instances.

Figure 6C:
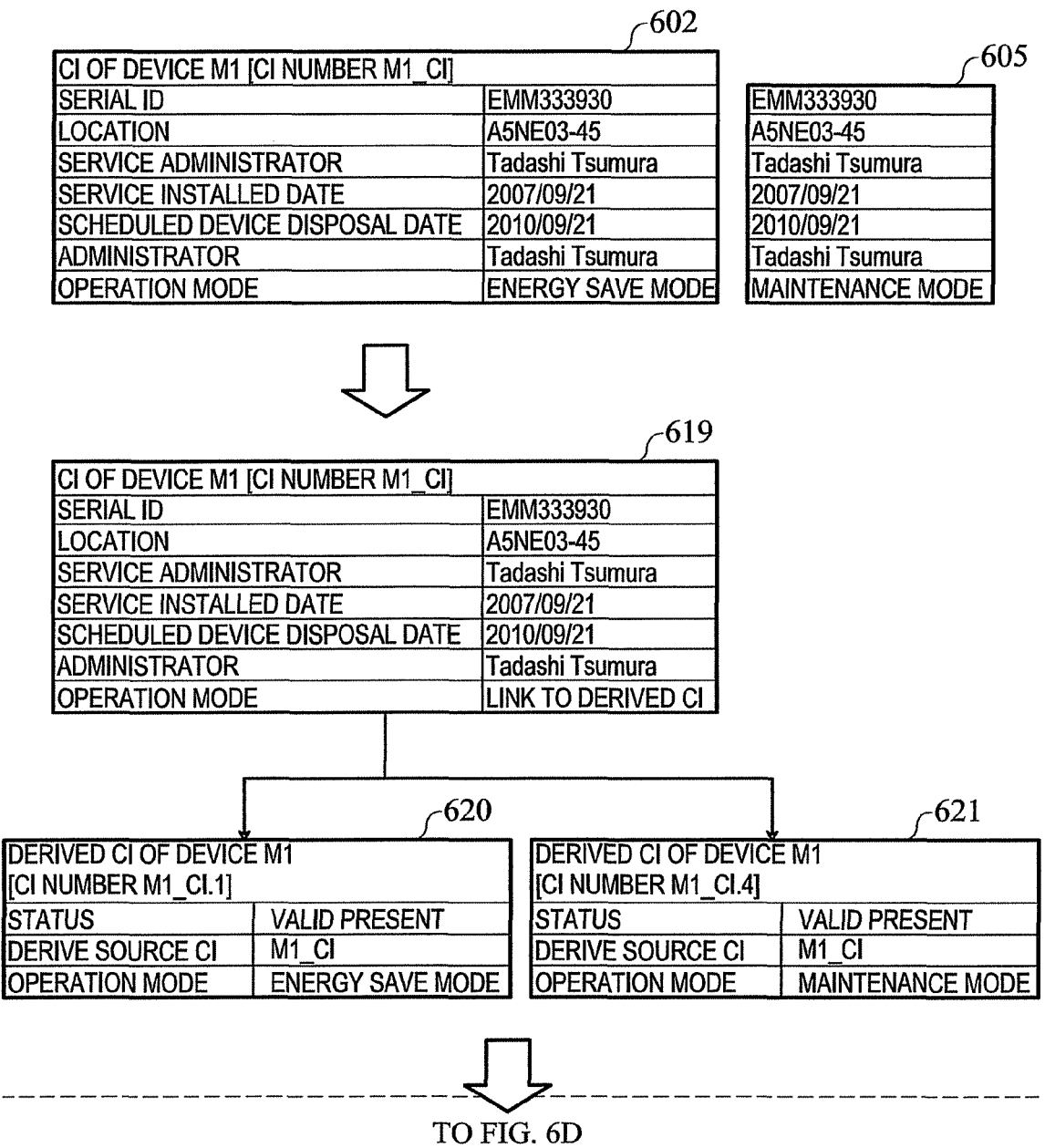
FIG. 6C shows the flow (¾) of automatic creation of a derived CI instance.

FIG. 6C shows the derive process to be performed by CI instance deriving section 310 (FIG. 3) when discovery section 301 detect information 603, 604, 605 on device M1 of different operation modes in the order of 605, 603 and 604. While the value of the operation mode of CI instance 602 of device M1 stored in CMDB 305 (FIG. 3) differs from the value of the operation mode of newly detected information 605 on device M1, the values of the other attributes match with one another. Therefore, CI instance deriving section 310 (FIG. 3) determines that the common attributes of device M1 are serial ID, location, device administrator, device installed date, scheduled device disposal date and administrator, and that the uncommon attribute of device M1 is the operation mode.

Therefore, a common CI instance 619 of device M1 includes attributes having a common attribute value, namely, serial ID, location, device administrator, device installed date, scheduled device disposal date and administrator. Common CI instance 619 of device M1 preferably has link data to derive sources CI 620, 621 of device M1, so that the derived CI instances are referred to for the attributes having uncommon attribute values. Common CI instance 619 of device M1 may have a CI instance identifier M1_CI.

Derived CI instances 620, 621 of device M1 include an attribute having an uncommon attribute value, namely the operation mode. Derived CI instances 620, 621 of device M1 respectively have CI instance identifiers M1_CI.1 and M1_CI.4.

Figure 6D:
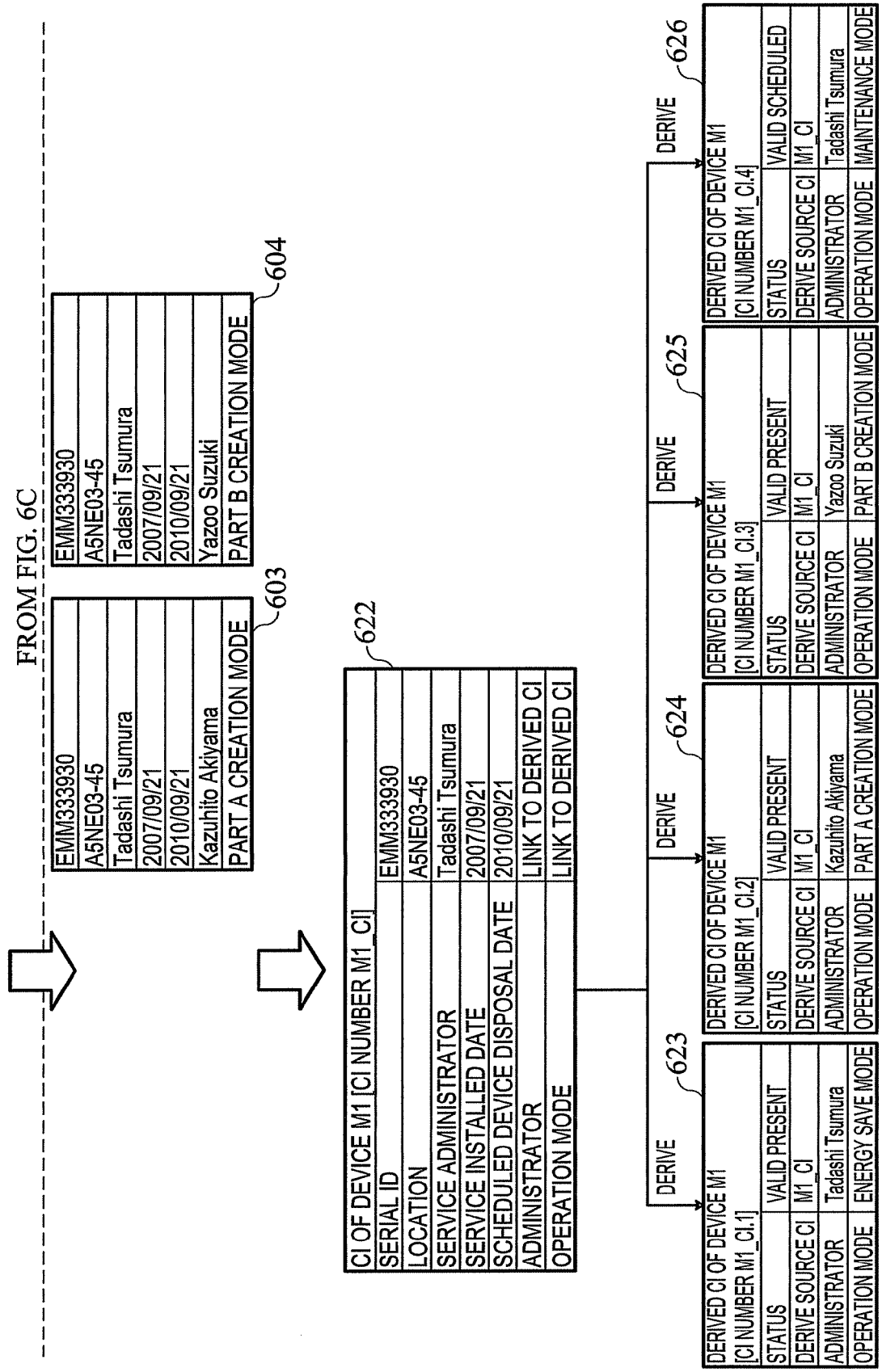
FIG. 6D shows the flow (4/4) of automatic creation of a derived CI instance.

Subsequently, when discovery section 301 detects information 603, 604 on device M1 of different operation modes, CI instance deriving section 310 (FIG. 3) performs the following derive process shown in FIG. 6D. The value of the administrator in CI instance 602 of device M1 stored in CMDB 305 (FIG. 3) differs from the values of the administrator in newly detected information 603, 604 on device M1. Therefore, the attribute "administrator" is an uncommon attribute. In such a case, even when the attribute "administrator" is determined to be previously common attribute (see FIG. 6C), CI instance deriving section 310 (FIG. 3) determines that the attribute "administrator" is an uncommon attribute. The value of the operation mode of CI instance 602 of device M1 stored in CMDB 305 (FIG. 3) differs from the values of the operation modes of newly detected information 603, 604 on device M1. The values of the other attributes match with one another. Therefore, CI instance deriving section 310 (FIG. 3) determines that the common attributes of device M1 are serial ID, location, device administrator, device installed date and scheduled device disposal date, and that the uncommon attributes of device M1 are the administrator and operation mode.

Therefore, a common CI instance 622 of device M1 includes attributes having a common attribute value, namely, serial ID, location, device administrator, device installed date and scheduled device disposal date. Common CI instance 622 of device M1 preferably has link data to derive CI instances 623, 624, 625, 626 of device M1, so that the derived CI instances are referred to for the attributes having uncommon attribute values. Common CI instance 622 of device M1 may have a CI instance identifier M1_CI.

Derived CI instances 623, 624, 625, 626 of device M1 include attributes having uncommon attribute values, namely the administrator and operation mode. Derived CI instance 623, 624, 625, 626 of device M1 respectively have M1_CI.1, M1_CI.2, M1_CI.3 and M1_CI.4.

As discovery section 301 sequentially detects information on devices to be managed in this manner, there may be a case where a common attribute and an uncommon attribute are changed. Accordingly, CI instance deriving section 310 (FIG. 3) can change the attributes of the common CI instance and derived CI instance in accordance with the changed common attribute and uncommon attribute.

Figure 7:
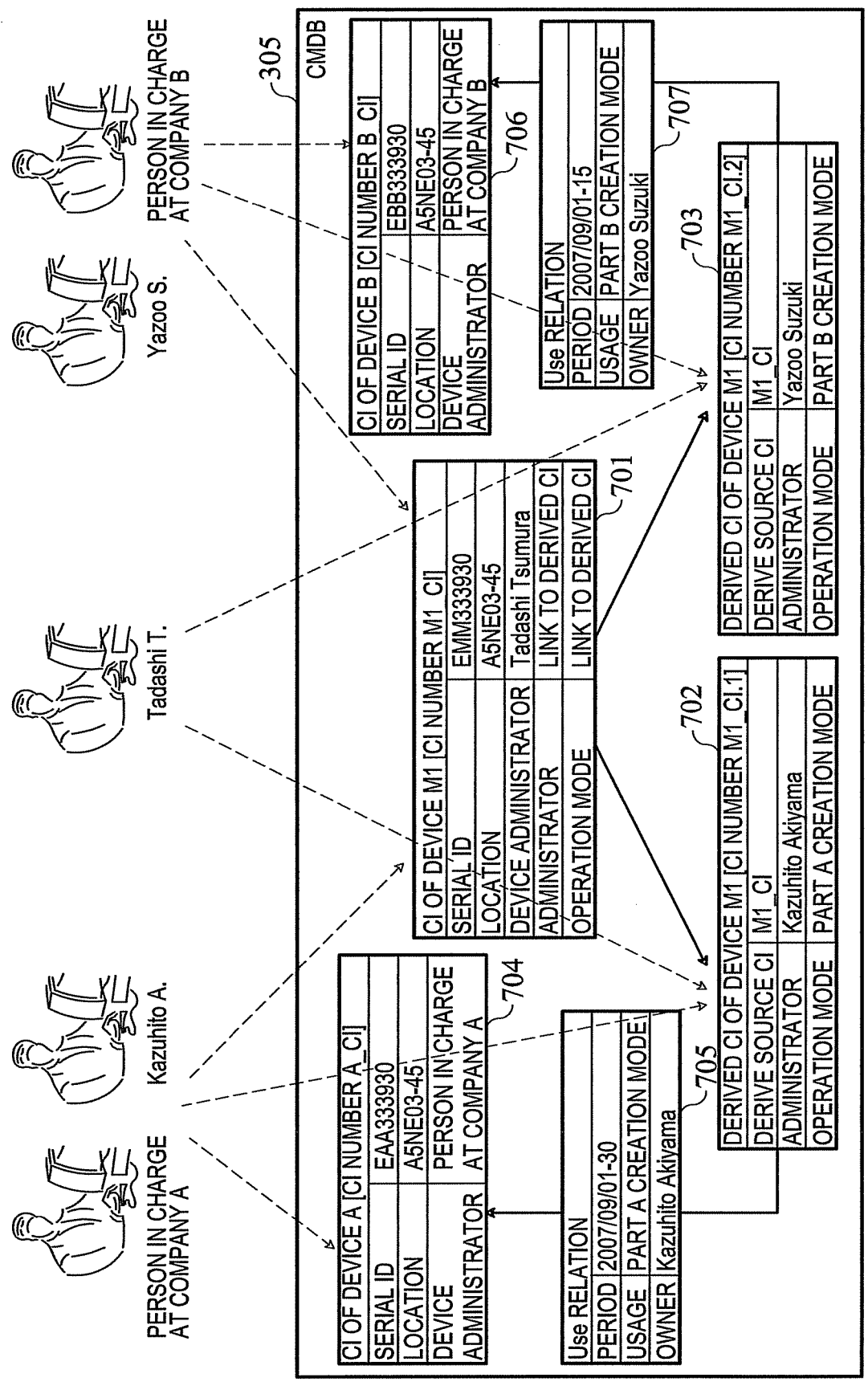
FIG. 7 shows visualization and access control of a CI instance.

FIG. 7 shows visualization and access control of a CI instance. Access control on each instance can be provided by using individual attribute values of a common CI instance, a derived CI instance and a relationship instance. Attribute values for access control are defined for each of data models of devices. Specifically, access control can be set for each CI instance. The attribute of the relationship instance can include attribute values of CI instances to be a source node and a target node.

In FIG. 7, the value of the attribute "device administrator" of common CI instance (M1_CI) 701 of device M1 indicates Tadashi Tsumura. Tadashi Tsumura who is the device administrator of device M1 can access all derived CI instances (M1_CI.1, M1_CI.2) 702, 703 of device M1 in addition to common CI instance 701 of device M1. The value of the attribute "administrator" of derived CI instance (M1_CI.1) 702 of device M1 indicates Kazuhito Akiyama. The value of the attribute "person in charge of device" of a CI instance (A_CI.1) 704 of device A associated with derived CI instance 702 of device M1 indicates a person in charge at company A. Therefore, Kazuhito Akiyama and the person in charge at company A can access common CI instance 701 of device M1, derived CI instance 702 of device M1, CI instance 704 of device A, and a relationship instance 705 of those devices. The value of the attribute "administrator" of derived CI instance (M1_CI.2) 703 of device M1 indicates Yazoo Suzuki. The value of the attribute "person in charge of device" of a CI instance (B_CI) 706 of device B associated with derived CI instance 703 of device M1 indicates a person in charge at company B. Therefore, Yazoo Suzuki and the person in charge at company B can access common CI instance 701 of device M1, derived CI instance 703 of device M1, CI instance 706 of device B, and a relationship instance 707 of those devices.

Figure 8A:
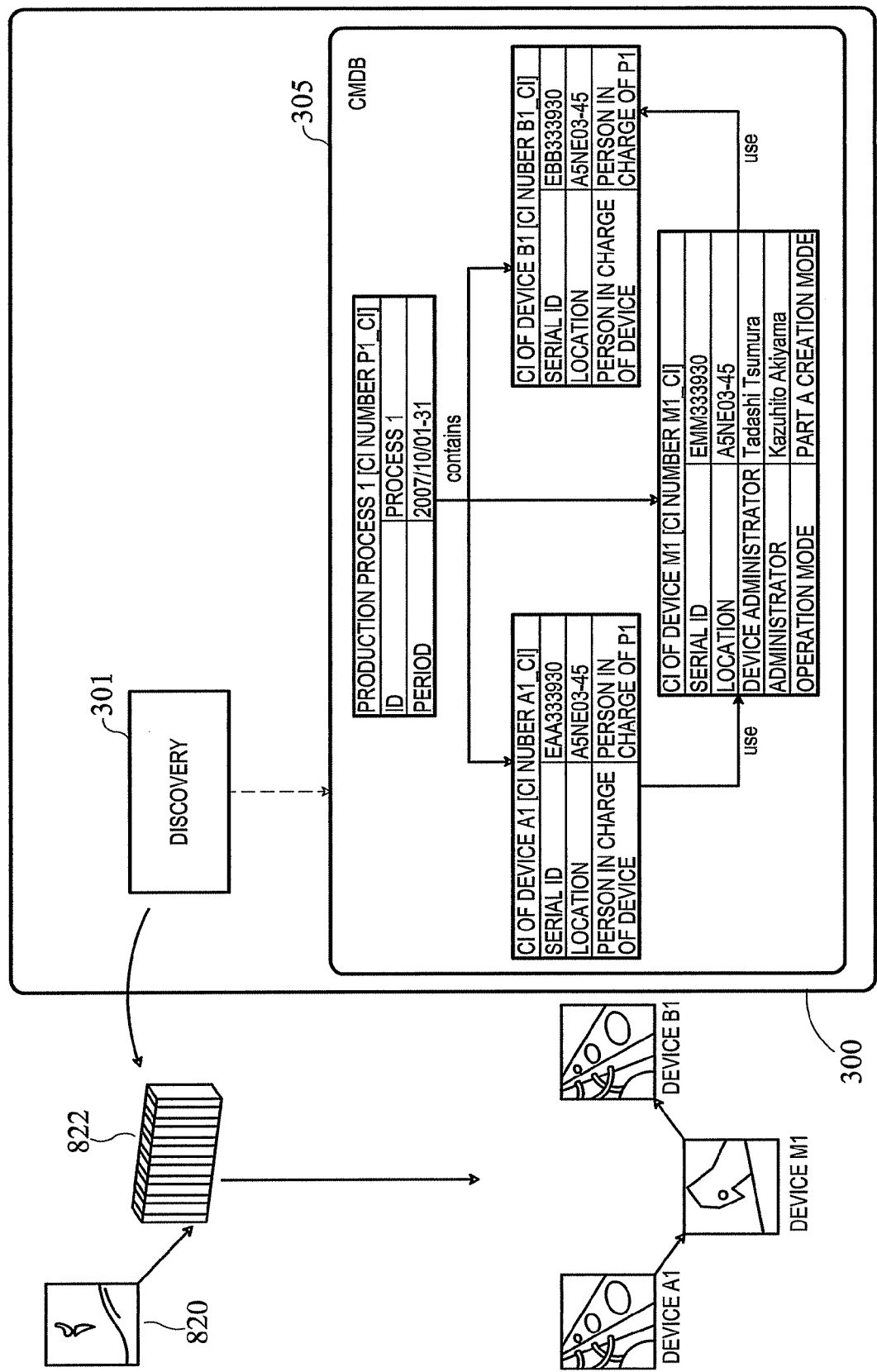
FIG. 8A shows an embodiment of management (1/3) of manufacturing devices at a foundry.
Figure 8B:
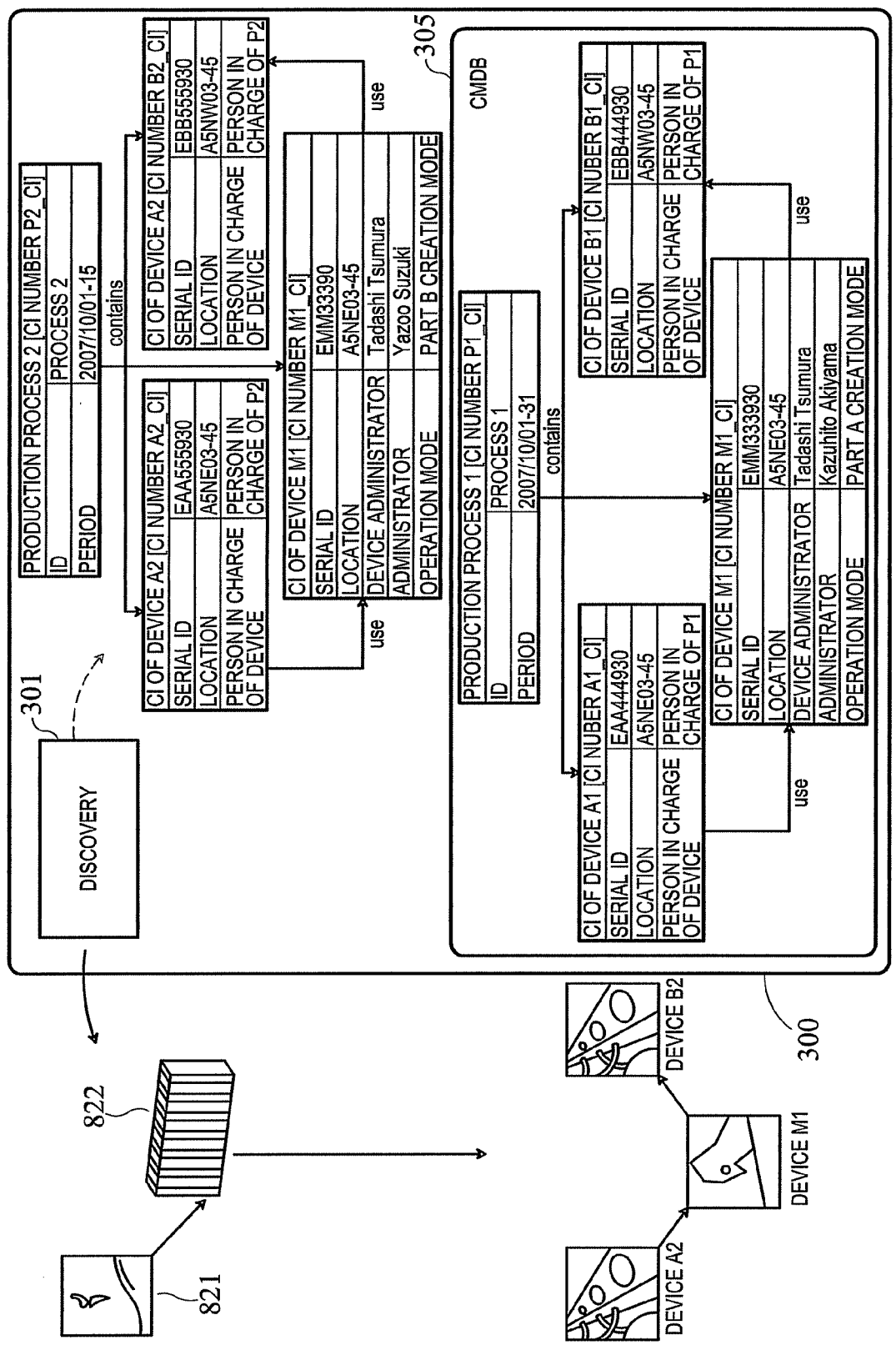
FIG. 8B shows the embodiment of management (2/3) of manufacturing devices at the foundry.
Figure 8C:
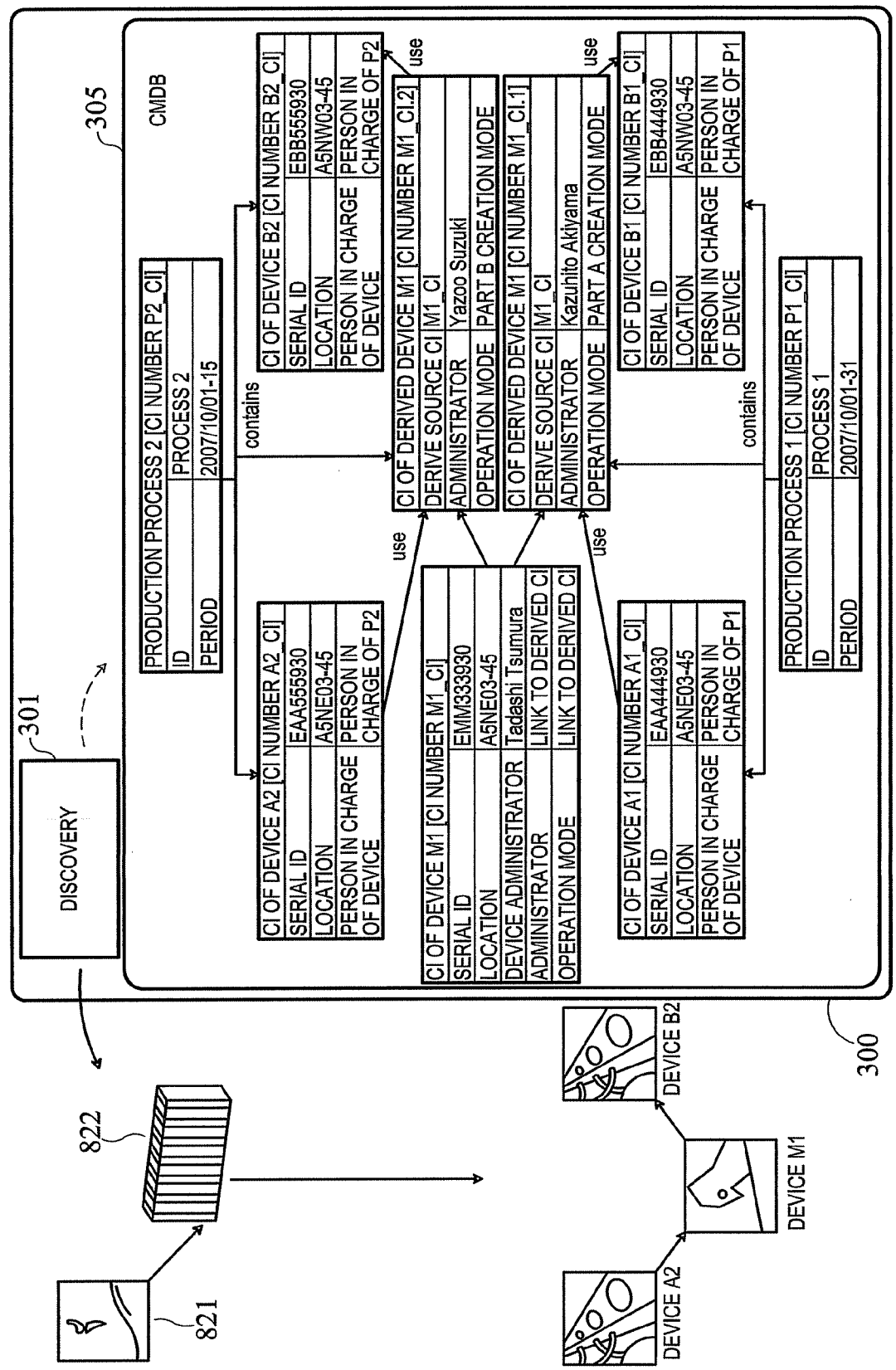
FIG. 8C shows the embodiment of management (3/3) of manufacturing devices at the foundry.

FIGS. 8A to 8C show an embodiment of management of manufacturing devices at a foundry. For example, at a factory (e.g., semiconductor factory) or the like where a plurality of manufacturing apparatuses are configured with a flexible relationship, each industrial device can be represented by a configuration item in the CMDB. Unlike an IT device which is operated with a normal configuration, an industrial device like a production device to be used at the semiconductor factory or a company (called foundry) who contracts with, for example, a fabless maker to manufacture products can be used in a plurality of processes in a short term or at the same stage. For example, when a foundry is requested from a plurality of companies, e.g., company A and company B, to manufacture respective products, a single industrial device may be used in a plurality of fabrication processes of the products at the same stage alternately in short terms, for example (e.g., day shift and night shift alternately). In such a case, if industrial devices are managed using a CMDB, a single industrial device which is shared in a plurality of fabrication processes can be managed and represented in the CMDB as an adequate configuration item.

A description of FIG. 8A will be given below. A foundry registers a production process 1 (one of CIs) from company A (820) with a controller (schedule management unit) 822. The production process 1 defines that a device A1, device M1 and device B1 are used, that device A1 uses device M1 and device M1 uses device B1, that those devices are used until Oct. 1, 2007 to 31, and that a person in charge of the devices is a person in charge of P1. Controller 822 controls device A1, device M1 and device B1. Discovery section 301 (FIG. 3) detects information on the production process 1 from controller 822. CI instance creating section 103 (FIG. 1) creates CI instances of the production process 1, device A1, device M1, device B1 and the relationship instances among the devices, and registers them in CMDB 305 (FIG. 3) of computer system 300 (FIG. 3). A CI instance P1_CI of the production process 1 includes, as attributes, a process ID and a period. The attribute value of the process ID is process 1, and the attribute value of the period is Oct. 1, 2007 to 31. Relationships among the CI instance of the production process 1 and the CI instances of other CIs, namely, device A1, device B1 and device M1, are "contains". The CI instance A1_CI of device A1 includes, as attributes, a serial ID, location and person in charge of device. A relationship between the CI instance of device A1 and the CI instance of another CI, namely, device M1, is "use". The CI instance M1_CI of device M1 includes, as attributes, a serial ID, location, person in charge of device, administrator and operation mode. A relationship between the CI instance of device M1 and the CI instance of another CI, namely, device B1, is "use". The CI instance B1_CI of device B1 includes, as attributes, a serial ID, location and person in charge of device.

A description of FIG. 8B will be given below. A foundry registers a production process 2 (one of CIs) from company B (821) with controller 822. The production process 2 defines that a device A2, device M1 and device B2 are used, that device A2 uses device M1 and device M1 uses device B2, that those devices are used until Oct. 1, 2007 to 15, and that a person in charge of device is a person in charge of P2. Controller 822 controls device A2, device M1 and device B2. Discovery section 301 (FIG. 3) detects information on the production process 2 from controller 822. CI identifying section 302 (FIG. 3) continues to determine whether device M1 contained in the production process 2 is also used or shared in the production process 1 previously registered with CMDB 305 (FIG. 3). When device M1 is shared, CI instance deriving section 310 (FIG. 3) creates, from the CI instance of device M1, the common CI instance M1_CI of device M1 and two derived CI instances M1_CI.1 and M1_CI.2 of device M1.

A description of FIG. 8C will be given below. CI instance deriving section 310 (FIG. 3) associates the common CI instance M1_CI of device M1 with the two derived CI instances M1_CI.1 and M1_CI.2. CI instance deriving section 310 (FIG. 3) associates the CI instance P1_CI of the production process 1 with one (M1_CI.1) of the derived CI instances of device M1. Therefore, relationships among the CI instance of the production process 1 and individual CI instances (A1_CI, B1_CI) of the other CIs, namely device A1 and device B1, and the derived CI instance M1_CI.1 of device M1 are "contains". CI instance deriving section 310 (FIG. 3) associates the CI instance P2_CI of the production process 2 with one (M1_CI.2) of the derived CI instances of device M1. Therefore, relationships between the CI instance of the production process 2 and individual CI instances (A2_CI, B2_CI) of the other CIs, namely device A2 and device B2, and the derived CI instance M1_CI.2 of device M1 are "contains". CI instance deriving section 310 (FIG. 3) registers the CI instance P1_CI of the production process 1, the derived CI instance M1_CI.1 of device M1, the derived CI instance M1_CI.2 of device M1, the individual CI instances A1_CI, B1_CI of device A1 and device B1, and the individual CI instances (A2_CI, B2_CI) of device A2 and device B2 with CMDB 305 (FIG. 3). Because one common CI instance and a plurality of derived CI instances corresponding in number to the number of devices which share device M1 are created from the CI instance of device M1, the administrator can manage device M1 to be shared in the CMDB based on the attribute values of the individual instances.

Because a single industrial device is effectively used in a shared manner by controlling a fabrication process using a CMDB for each fables maker and a foundry or by controlling the industrial device using a CMDB for each fabrication process in the above-described manner, for example, it may be possible to increase the efficiency of the fabrication process or the use rate of industrial devices.

Figure 9A:
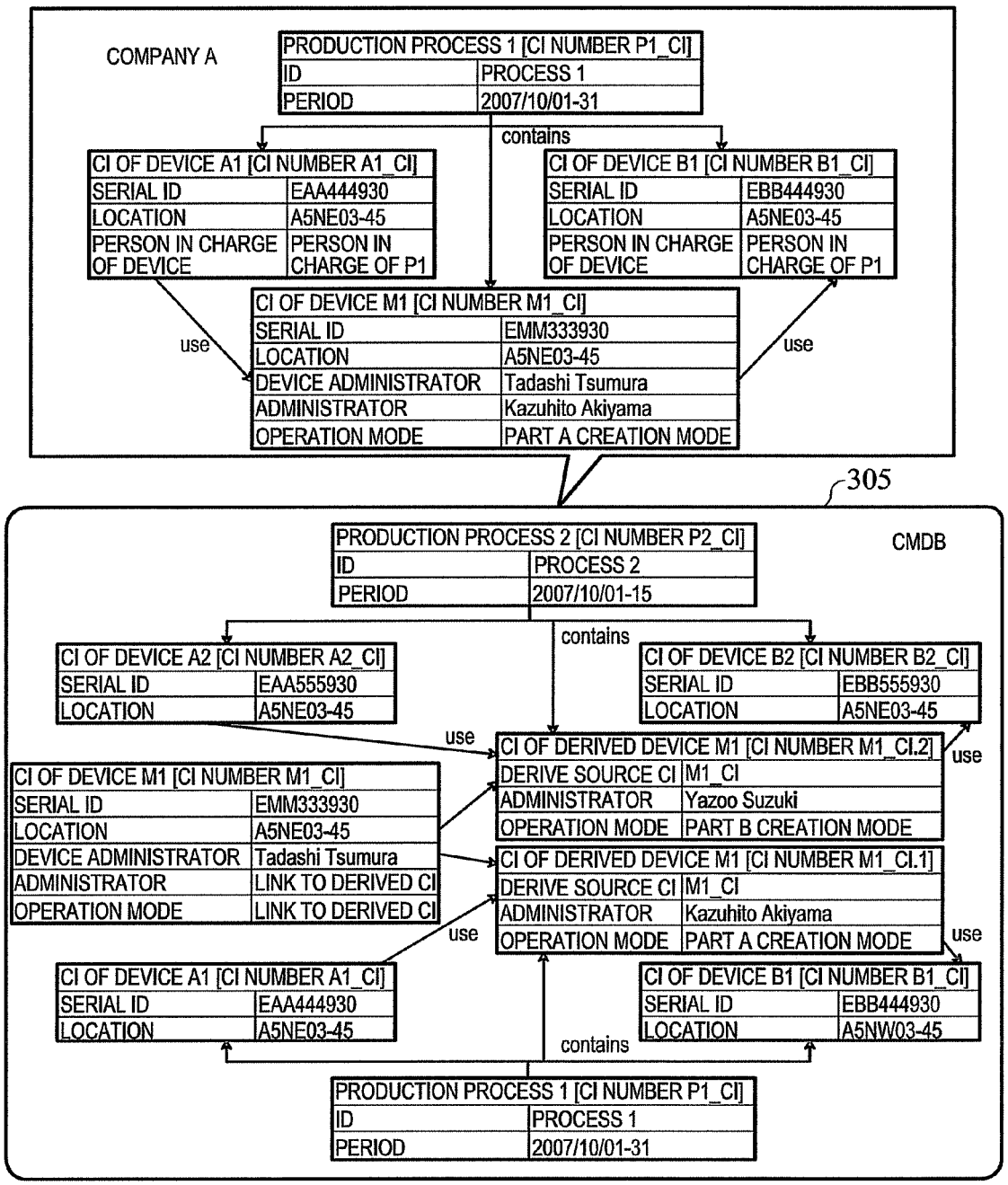
FIGS. 9A and 9B show an embodiment of access management of a manufacture device at a foundry.
Figure 9B:
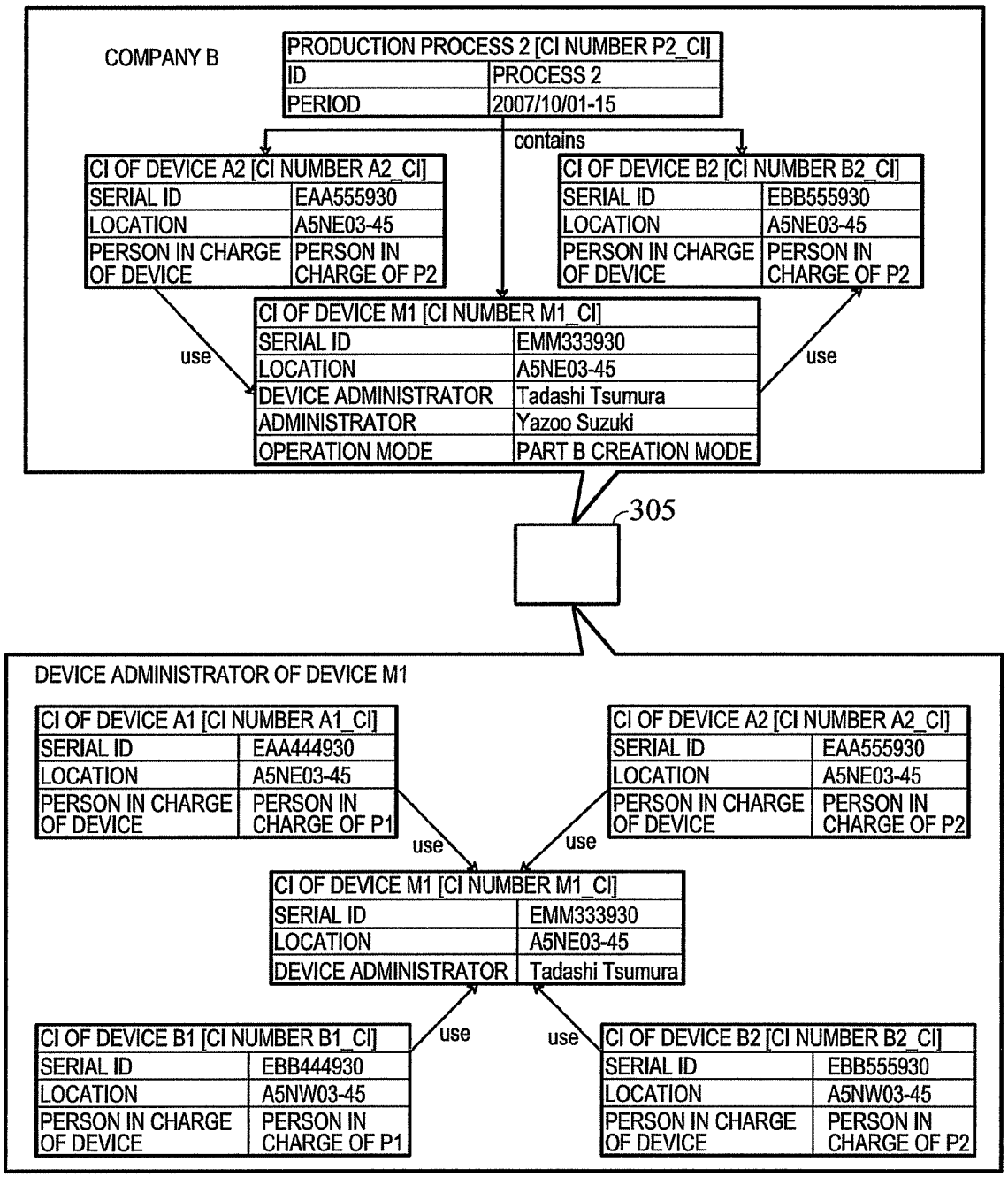

FIGS. 9A and 9B show an embodiment of access management of a manufacturing device at a foundry. Because the device administrator (Tadashi Tsumura) of device M1 can access the common CI instance of device M1, the instances of devices A1 and B1 which are in use relationship with the common CI instance, and the instances of devices A2 and B2, the device administrator can view those instances on the display device of the administrative console. It is to be noted however that with regard to the derived CI instance of device M1, the access of the device administrator of device M1 can be restricted so that the device administrator cannot view information specific to the production processes of company A and company B. Because the person in charge at company A, e.g., the person in charge of production process 1 (P1) can access the instances of the production process 1, device A1 and device B1, the common CI instance and derived CI instance identifier M1_CI.1 of device M1, the person can view those instances on the display device of the administrative console. It is to be noted however that the common CI instance and derived CI instance identifier M1_CI.1 of device M1 can be collectively displayed as one on the administrative console. Because the person in charge at company B, e.g., the person in charge of production process 2 (P2) can access the instances of the production process 2, device A2 and device B2, the common CI instance and derived CI instance identifier M1_CI.2 of device M1, the person can view those instances on the display device of the administrative console. It is to be noted however that the common CI instance and derived CI instance identifier M1_CI.2 of device M1 can be collectively displayed as one on the administrative console. Each administrative person associated with a production process can control access to each CI instance by performing access control for each derived CI instance. Derived CI instance access controller 312 (FIG. 3) executes the access control.

According to the embodiment, in this manner, access control is possible for the scenario of each of entities having various relationships, such as each person, each unit in a company, each company, and each group company, at the time a plurality of entities use an industrial device.

A computer which is used in the computer system according to the embodiment includes a CPU and a main memory which are connected to a bus. The CPU preferably has a 32-bit or 64-bit architecture; for example, the Xeon series, Core series, Pentium series, and Celeron series of Intel Corporation (Xeon, Core, Pentium, and Celeron are trademarks or registered trademarks of Intel Corporation or its subsidiaries in the United States and other countries), the Phenom series and Athlon series of Advanced Micro Devices, Inc. (Phenom and Athlon are trademarks or registered trademarks of Advanced Micro Devices, Inc.) can be used. The bus is connected with a display like an LCD monitor via a display controller. The display is used to display information on a computer connected to a network via a communication circuit and information on software running on the computer through an adequate graphic interface for the management of the computer system. The bus is also connected with a hard disk or silicon disk, and a CD-ROM or DVD drive via an IDE or SATA controller.

The hard disk stores an operating system (OS), a program which provides the Java processing environment like J2EE, an operation control program for the CMDB, other programs and data in a manner that they are loadable into the main memory. The operation control program may include TADDM (Tivoli Application Dependency Discovery Manager) which is provided by International Business Machines Corporation.

Particular embodiments of the computing system of the present disclosure can take the form of an entirely hardware embodiment, an entirely software embodiment or an embodiment containing both hardware and software elements. In a particular embodiment, the disclosed methods are implemented in software that is embedded in a processor readable medium and executed by a processor, which includes but is not limited to firmware, resident software, microcode, etc.

Further embodiments of the present disclosure can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

The CD-ROM or DVD drive is used so that a program is additionally installed onto the hard disk from a CD-ROM or DVD as needed. The bus is further connected with a keyboard and a mouse via a keyboard/mouse controller.

A communication interface conforms to, for example, the Ethernet protocol, and is connected to the bus via a communication controller to physically connect the computer and the communication circuit and provide the TCP/IP communication protocol of the communication capability of the operating system of the computer with a network interface layer. The communication circuit may be a cable LAN environment or a wireless LAN environment which conforms to the wireless LAN connection specifications, such as IEEE802.11a/b/g/n.

As a network connecting unit for connecting hardware like a computer, a router, a hardware control console and so forth are available in addition to the aforementioned network switch. The network connecting unit has a capability of returning configuration information, such as the IP address and MAC address of a computer connected to a computer on which the network operation control program is installed, in response to an inquiry in the form of a predetermined command from the latter computer. The network switch and router include an ARP table containing a list of pairs of IP addresses of computers connected thereto and corresponding MAC addresses for an address resolution protocol (ARP), and have a capability of returning the content of the ARP table in response to an inquiry in the form of a predetermined command. The hardware control console can return computer configuration information more detailed than the ARP table.

The hardware control console is connected to the computer. The hardware control console has functions to divide a single computer into a plurality of partitions using LPAR (Logical PARtion) and allow different OSs, such as Windows (Windows is a trademark of Microsoft Corporation in the United States, other countries, or both) and Linux (Linux is a registered trademark of Linus Torvalds in the United States, other countries, or both), in the individual partitions by VMware. Systematic inquiry to the hardware control console can provide detailed information in individual logical partitions of the computer running with LPAR•VMware.

Although the embodiment of the present invention has been described above, the described contents of the embodiment are merely an example of the present invention, and it should be apparent to those skilled in the art that various changes and improvements can be made to the embodiment without departing from the technical scope of the invention. For example, instead of a CMDB and CIs stored therein, another type of database and another type of CI can be used. Besides Java, any computer developing environment which can call up an API having a network control function, such as C++ or C#, can be used.

The invention claimed is:

1. A system comprising:
   memory including a repository that stores, for each particular configuration item of a plurality of configuration items, a set of data indicating at least one predetermined attribute of the particular configuration item and a relationship with another configuration item; and
   a processor coupled to the memory;
   wherein the processor is configured to detect target information identifying a set of configuration items of the plurality of configuration items, wherein the target information matches a predetermined attribute of each configuration item of the set of configuration items,
   wherein the processor is configured to create, based on the target information, a first association between a first configuration item of the set of configuration items with a second configuration item of the set of configuration items and a second association between the first configuration item with a third configuration item of the set of configuration items, wherein the first association and the second association are each an instance of a relationship association that includes a time period attribute that indicates a period of time when the relationship association exists.

2. The system of claim 1, wherein the processor is configured to create a common configuration item including information from the first configuration item and including a shared attribute for each attribute common to both the second configuration item and the third configuration item.

3. The system of claim 2, wherein the processor is configured to create a first derived configuration item for the first association and to create a second derived configuration item for the second association, wherein the first derived configuration item is based on the second configuration item and includes first derived attributes that define the first association, and wherein the second derived configuration item is based on the third configuration item and includes second derived attributes that define the second association.

4. The system of claim 3, wherein the first derived configuration item is associated with the common configuration item by a first link and the second derived configuration item is associated with the common configuration item by a second link.

5. The system of claim 4, wherein the first derived configuration item includes a first status attribute and the second derived configuration item includes a second status attribute, wherein the processor is configured to, when the first association terminates:
   set the first status attribute to inactive,
   remove the first link,
   delete the first derived configuration item from the repository, and
   remove the first association, and
   wherein the processor is configured to, when the second association terminates:
   set the second status attribute to inactive,
   remove the second link,
   delete the second derived configuration item the repository, and
   remove the second association.

6. The system of claim 5, wherein the processor is configured to delete the common configuration item when the first link and the second link are both removed.

7. The system of claim 3, wherein the common configuration item, the first derived configuration item, and the second derived configuration item are stored in the repository, wherein the first association identifies a first relationship of the second configuration item to the first derived configuration item, and wherein the second association identifies a second relationship of the third configuration item to the second derived configuration.

8. The system according to claim 3, wherein the first derived configuration item and the second derived configuration item each include at least one common derived attribute that identifies the common configuration item.

9. The system of claim 1, wherein the target information is detected by analyzing data stored in the repository that identifies the first association and identifies the second association.

10. The system of claim 1, wherein the relationship association includes a usage attribute that indicates a usage of the first configuration item that occurs during the period of time indicated in the time period attribute.

11. A method comprising:
    storing, at a repository, for each particular configuration item of a plurality of configuration items, data indicating at least one predetermined attribute of the particular configuration item and a relationship with another configuration item;
    detecting target information identifying a set of configuration items of the plurality of configuration items, wherein the target information matches a predetermined attribute of each configuration item of the set of configuration items; and
    creating, based on the target information, a first association between a first configuration item of the set of configuration items with a second configuration item of the set of configuration items and a second association between the first configuration item with a third configuration item of the set of configuration items, wherein the first association and the second association are each an instance of a relationship association that includes a time period attribute that indicates a period of time when the relationship association exists.

12. The method of claim 11, wherein the target information is defined by an administrator.

13. The method of claim 12, wherein the target information includes a time interval that is defined according to one of a number of days, a number of weeks, and a number of months, and wherein the target information is detected according to the time interval.

14. The method of claim 13, wherein the target information further comprises a target scope indicating a set of targeted configuration items of the plurality of configuration items, wherein detection of the target information is performed on the set of target configuration items.

15. The method of claim 12, wherein the set of targeted configuration items is chosen according to one or more predetermined attributes, wherein the one or more predetermined attributes are associated with location information identifying each configuration item of the set of targeted configuration items.

16. The method of claim 11, further comprising creating a common configuration item including information from the first configuration item and including a shared attribute for each attribute common to both the second configuration item and the third configuration item.

17. The method of claim 11, further comprising:
creating a first derived configuration item for the first association, wherein the first derived configuration item is based on the second configuration item and includes first derived attributes that define the first association; and
creating a second derived configuration item for the second association, wherein the second derived configuration item is based on the third configuration item and includes second derived attributes that define the second association.

18. The method of claim 17, wherein the first derived configuration item is associated with the common configuration item by a first link and the second derived configuration is associated with the common configuration item by a second link.

19. A computer-readable storage device comprising operational instructions that, when executed by a processor, cause the processor to:
store, at a repository, for each particular configuration item of a plurality of configuration items, data indicating at least one predetermined attribute of the particular configuration item and a relationship with another configuration item;
detect target information identifying a set of configuration items of the plurality of configuration items, wherein the target information matches a predetermined attribute of each configuration item of the set of configuration items; and
create, based on the target information, a first association between a first configuration item of the set of configuration items with a second configuration item of the set of configuration items and a second association between the first configuration item with a third configuration item of the set of configuration items, wherein the first association and the second association are each an instance of a relationship association that includes a time period attribute that indicates a period of time when the relationship association exists.

20. The computer-readable storage device of claim 19, further comprising operational instructions that, when executed by a processor, cause the processor to create a common configuration item including information from the first configuration item and including a shared attribute for each attribute common to both the second configuration item and the third configuration item.

* * * * *